US006790041B2

(12) United States Patent
Fountain

(10) Patent No.: US 6,790,041 B2
(45) Date of Patent: Sep. 14, 2004

(54) TRAINING METHODS FOR AIRCRAFT SIMULATOR PILOT

(75) Inventor: Phillip J. Fountain, Racine, WI (US)

(73) Assignee: Fountain & Associates, Inc., Racine, WI (US)

(*) Notice: Subject to any disclaimer, the term of this patent is extended or adjusted under 35 U.S.C. 154(b) by 171 days.

(21) Appl. No.: 10/176,346

(22) Filed: Jun. 20, 2002

(65) Prior Publication Data

US 2003/0054324 A1 Mar. 20, 2003

Related U.S. Application Data

(60) Provisional application No. 60/317,279, filed on Sep. 5, 2001.

(51) Int. Cl.[7] .............................................. G09B 19/16
(52) U.S. Cl. ...................................................... 434/30
(58) Field of Search ........................... 434/29, 30, 33, 434/34, 35, 50, 62, 65, 37; 283/23, 32, 33

(56) References Cited

U.S. PATENT DOCUMENTS 5,454,074 A * 9/1995 Hartel et al. ................ 345/710
5,522,026 A * 5/1996 Records et al. ............. 345/710

FOREIGN PATENT DOCUMENTS

WO        WO0225215 A2 * 3/2002
WO        WO0235303 A2 * 5/2002

OTHER PUBLICATIONS

International Space Station Operations Checklist, ISS–2A.2A & 2A.2B, Aug. 2000, National Aeronautics and Space Administration.*
Northwest Airlines, Inc.; B–757 Cockpit Operating Manual Flight Operations; Copyright, 1995.
Gulfstream; Pilot Checklist; Copyright, 1999, revision 2000.
Gulfstream; Quick Reference Handbook; Copyright revision #3, Apr. 2001, revision #4, May 2001.

* cited by examiner

Primary Examiner—John Edmund Rovnak
(74) Attorney, Agent, or Firm—Whyte Hirschboeck Dudek SC

(57) ABSTRACT

A method of training an aircraft pilot using a flight simulator having a controller that generates a plurality of simulated fault conditions and a fault analysis guide. The fault analysis guide includes a fault procedures section printed with a plurality of fault procedures each corresponding to a fault condition, and further includes a visual procedure locator section and a nonvisual procedure locator section. The visual procedure locator section includes printed indicator symbols that are arranged in the same general spatial orientation as the arrangement of a plurality of indicators a warning light panel. Each printed indicator symbol is graphically representative of a single indicator and has an associated locator symbol indicating the location of an appropriate fault procedure in the fault procedures section. The nonvisual procedure locator section includes a list of the physical error conditions not associated with the plurality of indicators.

59 Claims, 21 Drawing Sheets

FIGURE 1 (PRIOR ART)

EMERGENCY/ABNORMAL PROCEDURES

MASTER WARNING PANEL
ENGINE/APU
    APU FIRE      1
    ENGINE FAILURE TO START
    ENGINE TAIL-PIPE FIRE
    ENGINE FIRE
    ENGINE FAILURE BEFORE $V_1$
    ENGINE FAILURE AFTER $V_1$      2
    ENGINE FAILURE/SHUTDOWN IN FLIGHT
    SINGLE-ENGINE LANDING
        SINGLE-ENGINE GO-AROUND
        ENGINE VIBRATION
        ENGINE IMMEDIATE AIRSTART      3
        AIRSTART
        FAILURE TO RELIGHT
        ENGINE-OUT DRIFTDOWN
        DOUBLE ENGINE FLAMEOUT      4
        ENGINE SHUTDOWN CRITERIA
        ENGINE HOT
        START VALVE FAILS TO CLOSE AFTER START      5
ELECTRICAL
    ELECTRICAL-FIRE/SMOKE (UNKNOWN ORIGIN)
        DC GENERATOR FAILURE
        DC GENERATOR BEARING FAILURE      6
        GENERATOR HOT
        SPLIT BUS PROCEDURE      7
        DUAL GENERATOR FAILURE
        FEEDER FAULT
        BATTERY SWITCH FAILED OFF (LOSS OF THE ESSENTIAL DC BUS)      8
        BATTERY ONLY OPERATION
        FAILED RCCO ON SHUTDOWN
        ALTERNATOR FAILURE      9
        DUAL ALTERNATOR FAILURE
        ALTERNATOR HOT
        INVERTER MAIN BUS FAILURE
        INVERTER SECONDARY BUS FAILURE
        INSTRUMENT INVERTER BUS FAILURE
        INVERTER A HOT      10
        INVERTER C HOT
        INVERTER B HOT / INV MAIN BUS
        INVERTER B HOT / INV SEC BUS
        WINDSHIELD FAILURE
        WINDSHIELD HEAT FAILED      11
HYDRAULICS
    FLIGHT CONTROLS
        COMBINED HYDRAULIC SYSTEM PRESSURE LOW
        LOSS OF BOTH HYDRAULIC SYSTEMS      12
        RUNWAY ELECTRIC ELEVATOR TRIM

| ENGINE HOT | | L ENG HT | OR | R ENG HT |

1. POWER LEVER .................................................. RETARD
   IF LIGHT PERSISTS
2. HP FUEL COCK ..................................................... SHUT
3. POWER AND TRIM ..................................... AS REQUIRED
4. GEAR AND FLAPS ...................................... AS REQUIRED
5. COMPLETE ENGINE FAILURE CHECKLIST.

CRT DISPLAY

FIGURE 7

NON VISUAL PROCEDURES

AC ELECTRICAL
    NONE
DC ELECTRICAL
BATTERY ONLY OPERATION ................................................. 9
BATTERY SWITCH FAILED OFF (LOSS OF THE ESSENTIAL DC BUS) ........... 8
    FAILED GENERATOR RCCO .............................................. 9
    SPLIT BUS PROCEDURE ................................................ 7
ELECTRICAL
    FIRE/SMOKE (UNKNOWN ORIGIN) ....................................... 5
ENGINE
    AIRSTART ........................................................... 3
    DOUBLE ENGINE FLAMEOUT ............................................ 4
    -OUT DRIFTDOWN .................................................... 4
    FAILURE
        AFTER $V_1$ ..................................................... 1
        BEFORE $V_1$ .................................................... 1
        SHUTDOWN IN FLIGHT ........................................... 2
        TO RELIGHT ................................................... 3
        TO START ..................................................... 1
    IMMEDIATE AIRSTART ................................................ 3
    SHUTDOWN CRITERIA ................................................. 5
    SINGLE-ENGINE
        LANDING ...................................................... 2
        GO-AROUND ................................................... 2
    TAIL-PIPE FIRE ..................................................... 1
    VIBRATION ......................................................... 3
HYDRAULICS
    FLIGHT CONTROLS .................................................. 11
    LANDING GEAR .................................................... 16
        ADDITIONAL INFORMATION .................................... 15
    EMERGENCY EXTENSION ............................................. 15
        FAILURE TO RETRACT ......................................... 15
        RETRACTION FOLLOWING EMERGENCY EXTENSION ................ 15
    NOSEWHEEL STEERING FAILURE ..................................... 17
    RUNAWAY ELECTRIC ELEVATOR TRIM ................................ 12
    WING FLAP EMERGENCY
        ELECTRIC .................................................... 13
        HYDRAULIC (COMBINED HYDRAULIC FLUID LOSS) ................. 13
    UNDESIRED FLAP MOVEMENT ....................................... 13
PRESSURIZATION/PNEUMATICS
    EMERGENCY DESCENT .............................................. 18
MISCELLANEOUS
    COMPONENT AVAILABILITY ......................................... 22
    DITCHING .......................................................... 20
    EMERGENCY ESCAPE ROUTES ....................................... 20
    FIRE IN CABIN / COCKPIT ............................................ 19
    NUTCRACKER SYSTEM FAILURES ................................... 21
    SMOKE EVACUATION ............................................... 19
    SMOKE IN BAGGAGE COMPARTMENT, AFT GALLEY OR LAV ........... 19
    WINDSHIELD FAILURE .............................................. 11

\* \* \* \* \* \* \* \* \*

AFGCS Aural Warning System ............................................. 26
Aircraft Aural Warning System ............................................ 27
Aircraft Service Changes (ASC's) .......................................... 26

FIGURE 8

VISUAL PROCEDURES
(Warning Panel or Other Lights)

AC ELECTRICAL
- ALTERNATOR FAILURE............................................9
- ALTERNATOR HOT................................................9
- DUAL ALTERNATOR FAILURE.......................................9
- EXTERNAL POWER................................................24
- INVERTER A HOT................................................10
- INVERTER B HOT AND INVERTER MAIN BUS..........................10
- INVERTER B HOT AND INVERTER SEC BUS...........................10
- INVERTER C HOT................................................10
- INVERTER E HOT................................................23
- INVERTER INSTRUMENT BUS FAILURE...............................9
- INVERTER MAIN BUS FAILURE.....................................10
- INVERTER SECONDARY BUS FAILURE................................10
- WINDSHIELD HEAT FAILED........................................11

DC ELECTRICAL
- AUX MASTER WARNING.........................................23, 27
- BATTERY DISCONNECT............................................24
- BATTERY FAILURE...............................................23
- BRUSHLESS GENERATOR BEARING FAILURE...........................7
- DC GENERATOR FAILURE..........................................6
- DC MAIN.......................................................22
- DC EMERGENCY FEEDER...........................................24
- DUAL GENERATOR FAILURE........................................8
- ENERGIZE TRANSFORMER / RECTIFIER..............................24
- EXTERNAL BATTERY SWITCH.......................................24
- EXTERNAL POWER................................................24
- FAILED DIODE................................................6, 24
- FEEDER FAULT..................................................7
- GENERATOR HOT.................................................7
- OVERVOLTAGE................................................6, 24
- RADIO HOT.....................................................22
- TRANSFORMER / RECTIFIER.......................................22
- TRANSFORMER / RECTIFIER HOT...................................23

APU
- ALTERNATOR OFF................................................24
- ALTERNATOR HOT................................................23
- COWL INTAKE...................................................24
- FIRE..........................................................1
- OIL PRESSURE LOW..............................................24
- OIL PRESSURE HIGH.............................................24

ENGINE
- FIRE..........................................................2
- FIRE DETECT SHORT.............................................25
- HOT...........................................................5
- IGNITER.......................................................25
- OIL PRESSURE..................................................22
- START VALVE FAILS TO CLOSE AFTER START.....................5, 25
- REVERSER ARM, UNLOCK, DEPLOY..................................25
- ROTATION......................................................25

ICE & RAIN PROTECTION
- AOA HEATER FAILURE............................................25
- ICE DETECT....................................................24
- PITOT HEAT....................................................23

FIGURE 9

VISUAL PROCEDURES (Cont)
(Warning Panel or Other Lights)

```
WING WARM L & R .................................................. 24
WINDOW HEAT ...................................................... 24
FUEL SYSTEM
    BOOST PUMPS
        ALTERNATE L & R .......................................... 24
        MAIN L & R ............................................... 24
    CROSS FLOW ................................................... 24
    FILTER ....................................................... 22
    INTER TANK ................................................... 24
    LOW LEVEL ................................................ 22, 25
    PRESSURE ..................................................... 22
HYDRAULICS
    ANTISKID INOPERATIVE ......................................... 17
    AUTOPILOT
        AUTO PILOT ............................................... 25
        PITCH TRIM ............................................... 25
        TRIM MANUAL .............................................. 26
        TRIM UP, DOWN ............................................ 26
        YAW DAMP ................................................. 25
        YAW OFF .................................................. 26
    AUX HYDRAULIC HOT ............................................ 23
    COMBINED HYDRAULIC
        HOT ...................................................... 23
        PRESSURE LOW ............................................. 12
    FLIGHT HYDRAULIC HOT ......................................... 23
    FLAPS/STABILIZER INTERCONNECT FAILURE ........................ 12
    GROUND SPOILER FAILURE ....................................... 14
    GROUND SPOILERS FAIL TO DEPLOY ............................... 14
    LOSS OF BOTH HYDRAULIC SYSTEMS ............................... 12
    REVERSE UNLOCK/DEPLOY ........................................ 14
    RUDDER LIMIT ................................................. 26
    SINGLE RUDDER LIMIT .......................................... 26
    SPEED BRAKE EXTENDED ......................................... 26
    STALL BARRIER FAILURE ........................................ 25
    STALL BARRIER MALFUNCTION .................................... 13
    STALL WARNING MALFUNCTION .................................... 13
    TRIM OFF ..................................................... 23
    UTILITY HYD PUMP OFF ......................................... 23
PRESSURIZATION/PNEUMATICS
    AFT EQUIPMENT HOT ............................................ 18
    BLEED HOT .................................................... 18
    BLEED PRESSURE HIGH .......................................... 18
    COOLING TURBINE HOT .......................................... 18
    LOSS OF AUTOMATIC PRESSURIZATION CONTROL OR
        PRESSURIZATION SYSTEM RATE LIMITING ...................... 17
    LOSS OF PRESSURIZATION ................................... 17, 23
    MANUAL CABIN PRESSURIZATION .................................. 24
    PYLON HOT .................................................... 18
    WING HOT ..................................................... 19
MISCELLANEOUS
    CABIN DOORS .................................................. 23
    EQUIPMENT DOOR ............................................... 23
    FLIGHT RECORDER .............................................. 23
    TONE GENERATOR ............................................... 23
```

MASTER WARNING PANEL

| | | | | | |
|---|---|---|---|---|---|
| L OIL PRESS | 22 | R OIL PRESS | 22 | L ENG HT | 5 |
| L FUEL PRESS | 22 | FUEL PRESS | 22 | L PYLON HT | 18 |
| L GEN HT | 7 | R GEN HT | 7 | AFT EQUIP HT | 18 |
| L FUEL FILT | 22 | R FUEL FILT | 22 | L BLEED HT | 18 |
| BLEED PRESS | 18 | -------------- | | FUEL LOW LEVEL | 22 |
| L GEN | 6,7* | R GEN | 6,7* | L ALTNTR HT | 9 |
| L ALTNTR | 9 | R ALTNTR | 9 | T/R HT | 23 |
| TRANS/RECT | 22 | TRIM OFF | 23 | COMB HYD HT | 23 |
| COMB HYD | 12 | FLT HYD | 22 | AUX HYD HT | 23 |
| ANTI-SKID | 17 | UTIL HYD OFF | 23 | L WING HT | 19 |
| L MAIN FUEL | 24 | R MAIN FUEL | 24 | INV A HT | 10 |
| L ALT FUEL | 24 | R ALT FUEL | 24 | INV B HT | 10* |

\* Tabbed page contains a bridged procedure.

FIGURE 10

ASC 116

| | | | | | |
|---|---|---|---|---|---|
| L ENG HT | 5 | GND SPOILER | 14 | REV UNLOCK | 14 |
| L PYLON HT | 18 | CABIN DOORS | 23 | CABIN PRESS LO | 17<br>23 |
| BAT FAIL | 23 | -------------- | | CAB PRESS MAN | 17 |
| R BLEED HT | 18 | DC EMER FDR | 24 | CAB OXY ON | 17<br>23 |
| L DC FEEDER | 7* | R DC FEEDER | 7* | DC MAIN | 22 |
| R ALTNTR HT | 9 | L PITOT HT | 23 | R PITOT HT | 23 |
| APU ALTNTR HT | 23 | TONE GEN | 23 | INV SEC BUS | 10<br>10* |
| FLT HYD HT | 23 | AUX MASTER WARN | 23<br>27 | INV INST BUS | 9 |
| RADIO HT | 22 | STAB FLAP | 12 | INV MAIN BUS | 10<br>10* |
| R WING HT | 19 | STALL BRR VALVE NO. 1 | 13 | STALL BRR VALVE NO. 2 | 13 |
| COOL TURB HT | 18 | INV E HT | 23 | EQUIP DOOR | 23 |
| INV C HT | 10 | ICE DET | 24 | FLT RECORD | 23 |

\* Tabbed page contains a bridged procedure.

FIGURE 11

OVERHEAD PANEL

| APU FIRE | 1 | OIL TEMP HI | 24 | OIL PRESS LO | 24 | ALTNTR OFF | 24 |

| FLD BRG / FD OV | 7 24 | FLD BRG / FD OV | 6 24 | FLD BRG / FD OV | 6 24 |

| APU COWL INTLK | EXT BATT SW | AC EXT PWR | LEFT WING WARM | RIGHT WING WARM | LEFT FRONT WINDOW | RIGHT FRONT WINDOW |
|---|---|---|---|---|---|---|
| 24 | 24 | 24 | 24 | 24 | 11 / 24 | 11 / 24 |

| MANUAL CABIN PRESS | DC EXT PWR | FUEL CROSS FLOW | FUEL INTER TANK | LEFT SIDE WINDOW | RIGHT SIDE WINDOW |
|---|---|---|---|---|---|
| 24 | 24 | 24 | 24 | 11 / 24 | 11 / 24 |

| BATT 1 FAIL DISC | 24 | ENERGIZE TRANS RECT | 24 |

GLARESHIELD WARNING LIGHTS

| L FIRE PULL | NO GRN SPOILER | R FIRE PULL | REV ARM |
|---|---|---|---|
| 2 | 14 | 2 | REV UNLOCK |
|  |  |  | REV DEPL |

| L ENG FIRE DET SHORT | R ENG FIRE DET SHORT | 25 |

25

PILOTS AUXILIARY FLIGHT PANEL

| FAIL | 25 |
| HTR OFF | 25 |

FIGURE 12

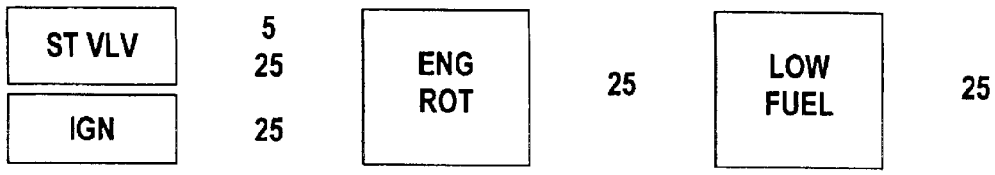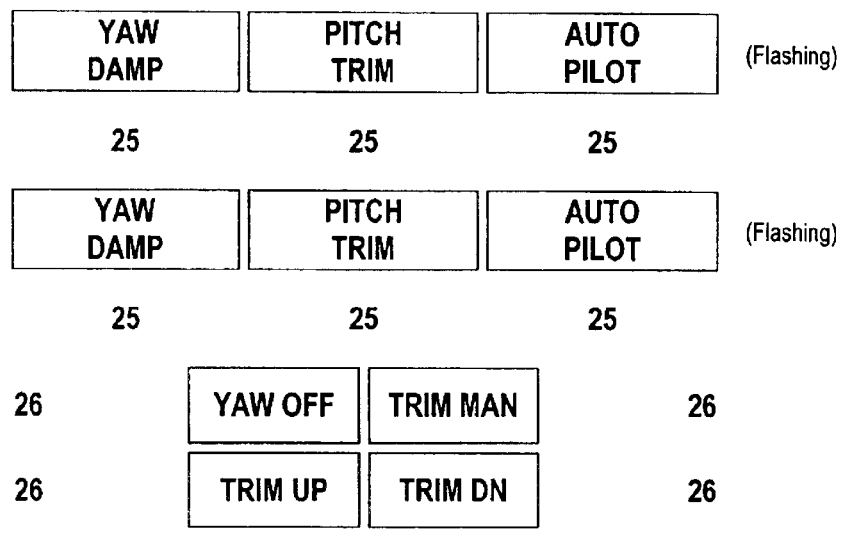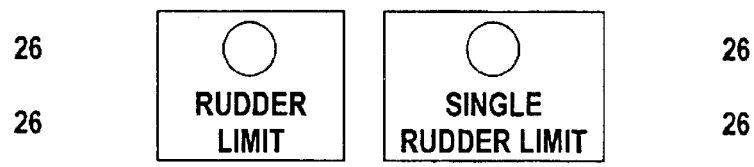
FIGURE 13

FIGURE 14

A
| | |
|---|---|
| AC EXT POWER | 9A |
| AC PWR FAIL, L-R | 5B |
| ACFT CONFIG | 4A |
| AFT BAG SMOKE | 4B |
| AHRS COOL FAIL | 8A |
| AP CTLR SW STUCK | 12A |
| APU FIRE | 14A |
| APU LOAD | 4A |
| APU ALT OFF | 12A |
| APU EXCEEDANCE | 12A |
| ALT BRG FAIL, L-R | 5A |
| ALT FUEL FAIL | 45A |
| ALT HOT, L-R | 5B |
| ALT MODE OFF | 6A |
| ANTI-SKID FAIL | 39B |
| AOA HEAT 1-2 FAIL | 8B |
| AP OFF | 7A |
| AP TRIM FAIL | 7A |
| APU ALT BRG FAIL | 8A |
| APU ALT HOT | 8A |
| APU LOAD | 8B |
| APU MASTER WARN | 8A |
| AT 1-2 FAIL | 10A |
| AT ENGAGE INHIBIT | 10A |
| AT NOT IN HOLD | 10A |
| AUX AC POWER FAIL | 7B |
| AUXILIARY HYD HOT | 7A |

B
| | |
|---|---|
| BAGGAGE DOOR | 5A |
| BATT 1-2 CHGR FAIL | 34A |
| BATT ON BUS | 34A |
| BLEED AIR HOT, L-R | 7A |
| BLEED AIR OFF, L-R | 7A |
| BLEED CONFIG | 7B |
| BLEED PRESS HI, L-R | 7A |
| BC 1-2-3 TEST FAIL | 10A |
| BRAKE FAIL | 38A |
| BRAKE OVHT | 38A |
| BRAKE PEDAL | 38B |
| BRAKE MAINT REQ'D | 40A |
| BUS CTLR 1-2-3 FL | 10B |

C
| | |
|---|---|
| CABIN DFRN-9.6 | 7A |
| CABIN DFRN-9.8 | 2A |
| CABIN OXYGEN ON | 7A |
| CABIN OXYGEN LOW | 2A |
| CABIN PRESS MANUAL | 7A |
| CALL | 12B |
| CDU 1-2 FAIL | 9B |
| CHECK DU 1-2-3-4-5-6 | 7B |
| CHECK PFD | 3A |
| CHECK PFD 1-2 | 3A |
| CHECK PDF 1-2 | 5A |
| CHECK V SPEEDS | 5A |
| CHECKLIST MISMATCH | 9A |
| CMB HYD FAIL | 37A |
| CMB HYD HOT | 10B |
| CONT IGN, L-R | 17A |
| CONV FAN FAIL, L-R | 7B |
| CONV HOT, L-R | 7B |
| COOL TURB HOT, L-R | 13B |
| COWL A/I ON, L-R | 11A |
| COWL A/I OVHT, L-R | 6A |
| COWL PRESS LOW, L-R | 6A |
| CPL DATA INVALID | 7B |
| CPL DATA INVALID | 10A |
| CREW OXYGEN OFF | 5A |

D
| | |
|---|---|
| DADC 1-2 FAIL | 9A |
| DADC MISCOMPARE | 9A |
| DAU 1A-1B-2A-2B FL | 9A |
| DAU 1-2 MISCMP ENG | 9B |
| DAU 1-2 MISCMP-MGS | 2A |
| DAU 1-2 MISCMP MSG | 9B |
| DAU 1-2 MISCMP MSG | 11A |
| DC CONFIG MISMATCH | 9A |
| DC ESS ON BATT | 33A |
| DC EXT POWER | 11B |
| DC POWER FAIL, L-R | 6A |
| DISP CTLR 1-2 FAIL | 10A |
| DU 1-2-3-4-5-6 HOT | 10A |
| DU FAN 1-2 FAIL | 6B |
| DOOR BAGGAGE | 2A |
| DOOR MAIN | 2A |

E
| | |
|---|---|
| E BATT 1-2-3-4- DISCH | 11B |
| E BATT 1-2-3-4 | 11B |
| EL MISTRIM NOSE UP/DN | 7B |
| ENG FLT LOOP ALRT | 6A |
| ENGINE COWL OPEN | 12B |
| ENGINE EXCEEDANCE | 12B |
| ENGINE EXCEEDANCE | 4A |
| ENG FIRE LOOP | 14A |
| ENGINE HOT, L-R | 14A |
| EPMP BATT SW OFF | 8A |
| EPMP POWER FAIL | 8A |
| EPR 1 DADC 2 | 12B |
| EPR2-DADC 1 | 12B |
| EXCEEDANCE RECORD | 12A |
| EXT BATTS SWITCH ON | 10B |

F
| | |
|---|---|
| FGC 1-2 FAIL | 5A |

FIGURE 15

FGC 1-2 MASTER . . . . . . 9B
FGC NOT USING IRS 1-2 . . 9B
FGC SYSTEM TEST . . . . . 9B
FLAME DETECT . . . . . . . 15A
FLAP ASYMMETRY
FLIGHT REC FAIL . . . . . 11A
FLT HYD FAIL . . . . . . . 37A
FLT HYD HOT . . . . . . . 12B
FUEL FILTER, L-R . . . . . 3A
FUEL INT TANK OPEN . . 12A
FUEL LEVEL LOW, L-R . . . 7B
FUEL PRESS LOW, L-R . . . 2B
FUEL TEMP HOT, L-R . . . 7B
FUEL XFLOW OPEN . . . 11A
FWC 1-2 FAIL . . . . . . . . 9A
FWD EXT SW PNL OPN . . 12B
FWD LAV SMOKE DETECT 4A
FWD LAV SVC DR OPN . . 10B
FWD RADIO RACK HOT . . 7B

G
GND SPOILER . . . . . . . 38A
GND SPOILER UNARM . . 11A
GPWS FAIL . . . . . . . . . 12A

H
HYD QTY LOW . . . . . . 38B

I
ICE DETECTED . . . . . . . 8B
IRS 1-2-3 COOL FAIL . . . 7A
IRS 1-2-3 ON BATTERY . . . 7A
IRS 1-2 ALN FAULT . . . . 7A
IRS 1-2 FAIL . . . . . . . . 12A
IRS 1-2 HI LAT ALN . . . . 12A
IRS 1-2 NAV READY . . . . 12A
IRS 1-2 ON DC . . . . . . . 12B
IRS MISCOMPARE . . . . . 12B
IRS MONITOR FAIL . . . . 12B
ISOLATION VLV OPEN . . 10A

M
MACH TRIM LIMIT . . . . . 5B
MACH TRIM OFF . . . . . .43B
MAIN FUEL FAIL, L-R . . .46A
MAINT SWITCH ON . . . . 12B

N
NAV MISCOMP L-R SEL . . 9A
NZ 1-2 FAIL . . . . . . . . 9B

O
OIL FILT BPASS, L-R . . . .19B
OIL PRESS LOW, L-R . . . . 1A

P
PAX OXYGEN OFF . . . . . 7A
PERF 1-2 FAIL . . . . . . . 11B
PITOT HT FAIL, L-R . . . . 5A

PROG MSG 1-2 FAIL . . . . . 7A
PROG MSG 1-2 MISMATCH . . 7A
PYLON HOT, L-R . . . . . . . 1B

R
RAD ALT 1-2 FAIL . . . . . . . 7B
RADIO RACK SMOKE . . . . 15A

RECENTER TURN KNOB . . .12B
REV UNLOCK, L-R . . . . . 38B
RETRIM L-R WING DOWN . .8B
RUDDER LIMIT . . . . . . . .12B
RUDDER STRG OFF . . . . . 12B

S
SELECT INHIBIT . . . . . . 12A
SERVICE DOORS . . . . . . 12A
SG 1-2-3 FAIL . . . . . . . . 9B
SG 1-2-3 HOT . . . . . . . . 9B
SMOKE DETECT . . . . . . .14A
SNGL RUDDER LIMIT . . . . 5B
SPD BRAKE EXTENDED . . . 5A
SPD BRAKE EXTNDED . . . 10A
SPD BRAKE SWITCH . . . . 10A
SSEC DISABLED . . . . . . . 6B
STAB-FLAP FAIL . . . . . . 37B
STALL BARRIER 1-2 . . . . . 8A
STALL BARR 1-2 FL . . . . . 8A
STALL BARRIER OFF . . . . 8A
STBY PITOT HT FAIL . . . . 8B
STEER BY WIRE FAIL . . . .40A

T
TAT PROBE HT FAIL . . . . . 8B
TRIM LIMIT . . . . . . . . . . 8A
T&L > 80% FULL . . . . . . 10A
TCAS FAIL . . . . . . . . . . 11A
TONE GEN FAIL . . . . . . . 11B
TONE GEN 1-2 FAIL . . . . . 11B
TRU FAIL . . . . . . . . . . . 8B
TRU HOT . . . . . . . . . . . 8B

U
UNDER FLOOR O'HEAT . . 7A
UTILITY HYD OFF . . . . . . 5A

V
VHF COMM 1-2-3 FL . . . . 10B
VNAV TRACK CHANGE . . . 10B
VOICE REC FAIL . . . . . . 12A
VOR COURSE . . . . . . . . 12B

W
WING A/I, L-R . . . . . . . 11A
WING HOT, L-R . . . . . . . 6A
WING TEMP LOW, L-R . . . 6A

Y
YAW DAMPER OFF . . . . . .38B

| ENGINE FIRE | L FIRE PULL |
|---|---|
| | R FIRE PULL |

```
1. Power Lever .................................... IDLE
   IF the fire warning light extinguishes with the power lever at idle THEN
      ) Test fire warning system
         IF system tests satisfactorily AND other engine parameters are
         normal THEN
            • There is no need to shut down the engine.
         ) Select engine bleed air OFF on affected engine.
         FINISHED
ELSE
   2. HP Fuel Cock .................................. SHUT
   3. Fire T-Handle ................................. PULL
   4. Fire Extinguisher .......................... SELECT NO. 1
```

IF fire warning light extinguishes THEN
       ) Test warning circuit
          IF light tests satisfactorily THEN
              5. Complete ENGINE FAILURE/SHUTDOWN procedure - TAB 2
              FINISHED
    ELSE IF fire warning light does not test OR
        remains illuminated for 30 seconds THEN
           5. Fire Extinguisher ..................... SELECT NO. 2
           6. Complete ENGINE FAILURE/SHUTDOWN procedure - TAB 2

CAUTION Do not attempt to restart an engine after a fire warning.

< End >

---

SINGLE-ENGINE LANDING

1. Perform normal Before Landing checklist.
2. Autopilot ............................................. OFF
3. Power Lever ....................... IDLE AFTER TOUCHDOWN
4. Brakes .......................................... AS REQUIRED
5. Reverse Thrust (Operating Engine) ............... AS REQUIRED < End >

FIGURE 16

MASTER WARNING PANEL
WARNING, CAUTION, AND ADVISORY LIGHTS

| L OIL PRESS  <br> R OIL PRESS | • Oil Pressure switch senses pressure less than 15 psi (103 kPA). <br> ➢ Check oil pressure gage reading <br> ➢ Shut down engine if pressure is abnormally low. <br> ENGINE FAILURE / SHUTDOWN procedure – TAB 2 |
|---|---|
| L FUEL PRESS <br> R FUEL PRESS | • Fuel pressure at the inlet to the high-pressure fuel pump is less than 15 psi (103 kPa) or both fuel boost pumps on one side have been turned off with the crossflow value closed. <br> ➢ Check that boost pumps are on and functioning. <br> ➢ Check crossflow value position. <br> ➢ Check for erratic fuel flow indication. <br> ➢ Shut down engine if operation becomes erratic. <br> ENGINE FAILURE / SHUTDOWN procedure – TAB 2 |
| L FUEL FILT <br> R FUEL FILT | • Fuel filter is clogged. <br> ➢ Shut down engine is fuel flow becomes erratic. <br> ENGINE FAILURE / SHUTDOWN procedure – TAB 2 |
| FUEL LOW LEVEL | • Fuel level in hopper is below approximately 700 pounds (318 kg). <br> ➢ Ensure that fuel boost pumps are on. <br> ➢ Check fuel quantity gages. <br> ➢ Open crossflow valve. <br> A/C with ASC 115 or 339 and SUBSEQUENT ____ |
| DC MAIN | • DC main bus is not energized (will occur only with battery switch in EMER position). <br> ➢ Energize main DC bus. |
| FLT HYD | • Loss of flight hydraulic system pressure has occurred. <br> ➢ Check flight hydraulic pressure gage. <br> If System has failed THEN <br>   ➢ Turn YAW DAMP switch OFF. <br>   ➢ Land as soon as possible. |
| TRANS/ RECT | • Transformer-rectifier has no output. <br> ➢ Check that an alternator has been selected, or select another alternator to power transformer-rectifier. |
| RADIO HT | • Temperature in the radio rack area is 200° F. <br> ➢ Attempt to isolate hot equipment and shut down. <br> ➢ Turn off unnecessary radio equipment. |

FIGURE 17

BATTERY SWITCH FAILED OFF
(LOSS OF THE ESSENTIAL DC BUS)

NOTE For aircraft with ASC 155 ___ installed, in the event of loss of essential DC power, the transformer rectifier should be used to restore power to the essential DC bus.

Proceed as follows:

1. Transformer-Rectifier ................................ ESS DC BUS
   - The essential DC bus should be powered from the transformer-rectifier.
2. Battery Switch ...................................... EMERG
   IF the battery switch cannot be moved to the EMERG position THEN
   ⟩ The T/R switch must remain in the ESS DC position to retain power.
3. Alternator(s) ....................................... CHECKED ON
4. Essential DC Voltage ................................ CHECKED

NOTE Voltage should read 25 volts or higher.

5. Fuel Boost Pumps (4) ................................ ON
6. Crossflow .......................................... AS REQUIRED
7. Transformer-Rectifier Ammeter ....................... CHECKED
   (200/300 amps maximum, depending on transformer-rectifier installed)
8. Generator(s) ....................................... CHECKED ON

WARNING For aircraft having ASC 80 ___ incorporated.
   ⟩ Place the left and right generator emergency switches to EMERG just prior to landing to prevent possible loss of main DC bus on touchdown.

NOTE With a battery switch failure, the main DC bus should still be powered by the generator(s)

IF the Transformer-Rectifier cannot be used to power the Essential DC Bus AND the Generators are On THEN
   ⟩ Select the T/R switch to MAIN
   ⟩ Terminate the flight as soon as practical.

< End >

FIGURE 18

APU FIRE

| APU FIRE |

1. APU Master Switch .................................... OFF
2. Fuel Boost Pumps ..................................... OFF
3. APU Fire Extinguisher ................................. ON 4. Engines ............................................ SHUTDOWN < End >

ENGINE FAILURE TO START

- Failure of the engine to start or reach idling speed may be caused by:
  - No rotation
  - No fuel ignition
  - Lack of acceleration above 30 to 40 % $N_2$

- <u>Fuel ignition should result within ten (10) seconds</u> after opening the high pressure fuel cock.
  > If there is no indication of ignition:
  1. HP Fuel Cock ......................................... SHUT
  2. Start Master Switch .................................. OFF > Prior to attempting another start, perform an engine cranking cycle to expel fuel from the engine.
  > Ensure high-pressure rotor has stopped rotating before engaging starter.

NOTE For airplanes having ASC 199___ (single igniter ground start), select AIR START ON prior to attempting subsequent engine start.

- Some engine controls may exhibit the tendency to cause the engine to hang at 30 to 40% $N_2$ during start. This is particularly true with the first start of the day.

IF Engine Hanges THEN
  > Momentarily selecting the fuel boost pumps OFF
    (This may assist in obtaining a start)
  > Select the boost pumps on once the engine has reached idle.

< End >

FIGURE 19

BATTERY ONLY OPERATION

> When any electrical condition requires operation on batteries only, proceed as follows:

1. Crossflow .................................................. OPEN
2. Fuel Boost Pumps (One Main Only) ......... ON (ALL OTHERS-OFF)
3. Battery Disconnect Switch Lights ....................... OUT
4. Battery Master Switch ........................... EMERGENCY
5. Left and Right Generator ............................... TRIP
6. Left and Right Alternator .............................. OFF
7. Inverters (Main and Secondary) ........................ OFF
8. All Nonessential Items ................................. OFF < End >

FAILED GENERATOR RCCO

IF the L or R GEN light does not illuminate when selected OFF during engine shutdown THEN

- The RCCO has failed closed.

1. Generator Switch ...................................... ON
2. Appropriate Battery DISC Switch    1 FOR LEFT GEN
                                     2 FOR RIGHT GEN .. PRESS 3. Appropriate L or R FWD FDR FAULT Circuit Breaker ......... PULL
    L FWD FDR FAULT COPILOT CB PANEL R ___ C ___
    R FWD FDR FAULT COPILOT CB PANEL R ___ C ___

4. Shutdown engine with GEN switch selected ................. ON

< End >

ALTERNATOR FAILURE      | L ALTNTR |  OR  | R ALTNTR |

1. Ammeter/Voltmeter ................................. CHECKED
2. Alternator Circuit Breakers ....... CHECK COPILOT'S CB PANEL
      L ALTNTR CONT on the COPILOT CB PANEL R ___ C ___
      R ALTNTR CONT on the COPILOT CB PANEL R ___ C ___
3. Alternator Switch ........................... OFF, THEN ON IF Alternator fails to reset THEN
    4. Alternator Switch ................................. OFF
      NOTE  Monitor Buses will be unpowered.
    > Monitor load on remaining alternator.

< End >

FIGURE 20

- Circuit Breakers listed in BLUE are referenced by the procedures in this manual.

- Col 1 on the Copilot CB Panel is on the right side of the panel with the col count increasing from right to left. On all other panels, Col 1 is on the left side with the col count increasing from left to right.

- When a Circuit Breaker is not aligned with a given row, the row number is not provided.

- At times a given Row and Col may not have a Circuit Breaker. When this occurs, the position of the missing CB should be counted in locating the desired Column.

| CB Name | Panel | Row | Col |
|---|---|---|---|
| "A" INV PWR | COPILOT CB PANEL | 7 | 3 |
| "B" INV PWR | COPILOT CB PANEL | 7 | 2 |
| "C" INV PWR | COPILOT CB PANEL | 7 | 1 |
| "E" INV PWR | COPILOT CB PANEL | 7 | 4 |
| AC EXT PWR | Copilot CB Panel | 3 | 3 |
| AD/RPTR | Copilot CB Panel | 14 | 13 |
| ADC XFER | Copilot CB Panel | 11 | 10 |
| ADF 1 | Copilot CB Panel | 10 | 9 |
| ADF 2 | Copilot CB Panel | 10 | 8 |
| AFT CB PNL - INST 115 VAC FDR | Main Power Box | E | 7 |
| AFT CB PNL - MAIN 115 VAC FDR | Main Power Box | E | 6 |
| AFT CB PNL - SEC 115 VAC FDR | Main Power Box | E | 5 |
| AFT CB PNL FDR | Main Power Box | B | 5 |
| AFT CB PNL FDR 1 | Main Power Box | A | 2 |
| AFT CB PNL FDR 2 | Main Power Box | A | 4 |
| AFT CB PNL MAIN FDR 1 | Main Power Box | D | 12 |
| AFT CB PNL MAIN FDR 2 | Main Power Box | D | 13 |
| AIR COND | Pilot CB Panel | 3 | 5 |
| AIR DATA 1 | Copilot CB Panel | 11 | 7 |
| AIR DATA 2 | Copilot CB Panel | 11 | 6 |
| AIR INLET DOOR | Copilot CB Panel | 2 | 2 |
| ALT PUMP CONT | Pilot CB Panel | 9 | 3 |
| ALTNTR CONT L | COPILOT CB PANEL | 2 | 2 |
| ALTNTR CONT R | COPILOT CB PANEL | 2 | 1 |
| ALTNTR INPUT L | COPILOT CB PANEL | 1 | 2 |
| ALTNTR INPUT R | COPILOT CB PANEL | 1 | 1 |
| ANG ATT CMPTR 1 | PILOT CB PANEL | 6 | 1 |
| ANG ATT CMPTR 2 | PILOT CB PANEL | 6 | 4 |
| ANG ATT IND 1 | Pilot CB Panel | 6 | 5 |
| ANG ATT PROBE HT 1 | PILOT CB PANEL | 6 | 2 |
| ANG ATT PROBE HT 2 | MAIN POWER BOX | C | 11 |
| ANNUN 1 | Copilot CB Panel | 15 | 11 |
| ANNUN 2 | Copilot CB Panel | 15 | 8 |
| ANTI SKID WARN | Pilot CB Panel | 4 | 8 |
| ANTI-SKID TEST | Pilot CB Panel | 5 | 8 |
| AP 1 | COPILOT CB PANEL | 12 | 10 |
| AP 1 | COPILOT CB PANEL | 7 | 6 |
| AP 2 | COPILOT CB PANEL | 13 | 10 |
| AP 2 | COPILOT CB PANEL | 7 | 5 |
| AP BUS | Copilot CB Panel | 6 | 10 |
| APPR INDXR | Copilot CB Panel | 11 | 5 |
| APU ALTNTR CONT | Copilot CB Panel | 3 | 1 |
| APU ALTRNTR INPUT | Copilot CB Panel | 3 | 2 |
| APU CONT | Pilot CB Panel | 3 | 2 |
| APU FIRE EXT | Pilot CB Panel | 10 | 10 |
| APU FIRE WARN | Pilot CB Panel | 9 | 8 |
| APU POWER | Copilot CB Panel | 2 | 1 |
| APU START | Pilot CB Panel | 3 | 1 |
| ATC XPONDER 1 | Copilot CB Panel | 11 | 9 |

LANDING GEAR FAILURE TO RETRACT

Condition 1 — Landing Gear Selection Handle Moves to the UP Position.

IF the gear fail to retract on takeoff THEN
- the landing gear selection handle should be returned to the DOWN position.
- the airplane should return to the field for landing and troubleshooting on the ground.

The use of the D-ring in an attempt to retract the gear is not recommended.

Condition 2 — Landing Gear Selection Handle Will Not Move from the DOWN Position.

IF the lock release button must be depressed to raise the gear handle THEN
- turn the ground spoiler switch off.
- consider nutcracker malfunction. See NUTCRACKER SYSTEM FAILURES procedure Tab 21.

≪ End ≫

LANDING GEAR EMERGENCY EXTENSION

Alternate extension will be required if:
- <u>normal extension does not result</u> in a down-and-locked gear condition.
- <u>a loss of combined system fluid</u>, since the utility system will be ineffective.

A fully charged nitrogen bottle (3,000 psi at 70° F [21° C]) will allow only one extension of the landing gear.

1. Landing Gear Selection Handle .......................... DOWN

IF combined system fluid is lost THEN GOTO step 4.
ELSE
   IF combined/utility pressure is available THEN 2. Emergency Landing Gear T-Handle ................. DOWN
   - Push handle down to assure that it is fully seated. Wait a minimum of 30 seconds after reseating T-handle.

3. Dump Valve D-Ring ........................ PULL/RESTOW
   - Handle must be pulled up fully and held for ten seconds
   - Then D-Ring Restowed
   - If this procedure does not result in a proper gear position and indication, GOTO step 4

ELSE
   4. Airspeed .............................. 175 KCAS (MAX)
   5. Emergency Landing Gear T-Handle .................... PULL

TRAINING METHODS FOR AIRCRAFT SIMULATOR PILOT

RELATED APPLICATIONS

This application claims the benefit of the filing date of the provisional patent application serial No. 60/317279, filed on Sep. 5, 2001.

COPYRIGHT NOTICE

A portion of the disclosure of this patent document contains material subject to copyright protection. The copyright owner has no objection to the reproduction by anyone of the patent document or the patent disclosure as it appears in the Patent and Trademark Office patent file or records, but otherwise reserves all copyright rights whatsoever.

FIELD OF THE INVENTION

The present invention relates to a method for training aircraft pilots in an aircraft flight simulator. In particular, the invention utilizes a fault analysis guide to aid a pilot in the identification of a fault condition, the location of a corresponding fault procedure to be performed by the pilot, and the performance of the fault procedure associated with the given fault condition.

BACKGROUND OF THE INVENTION

The majority of flight crew training today occurs in aircraft flight simulators. Training is also performed in the aircraft itself but in general the flight simulator is safer and does a better job of presenting an actual problem without the hazards of the actual problem in the aircraft. A typical flight simulator can closely duplicate the feel of a specific aircraft.

Every aircraft is required to have an Aircraft Flight Manual (AFM) that is used to train pilots. Each AFM has a section describing procedures for handling emergency or abnormal problems. Using the AFM, the aircraft manufacturer, training provider, or aircraft operator can create a manual or checklist of these procedures to be used as a resource during emergencies. Typically, this emergency manual or checklist includes pages such as an index for locating an appropriate procedure and pages for presenting the various procedures in a series of steps for the pilot to perform, along with other pertinent information regarding those procedures.

As aircraft and flight training manuals have become more complicated over the last sixty years, so have the emergency manuals and procedures become more complex. The organization of the index or procedure locator section becomes critical to the efficient use of the manual. In addition, very little has been done heretofore to standardize the presentation and description of the procedures themselves in the manuals. Different entities such as the aircraft manufacturer, the training provider, government agencies, the airline, and aircraft operators all have their own agendas regarding how to present aircraft procedures to flight crew members in training. A standard way for presenting and describing aircraft procedures that has been applied across all aircraft and company systems in the aircraft industry therefore does not exist. Small differences in the design and presentation of manuals and checklists can be roadblocks to both the location of an appropriate procedure and the smooth execution of that procedure, especially when pilots are required to fly more than one type of aircraft.

Additionally, flight crews operate in a multi-dimensional environment so that when aircraft emergencies or abnormal conditions occur, appropriate response procedures need to be quickly identified and accomplished even though there are often other cockpit tasks that simultaneously need consideration. Flight crew stress is related to the effective handling of aircraft emergencies. Confusion and doubt caused by the various different types of emergency manuals only creates additional stress, which diminishes the likelihood of locating and efficiently accomplishing the appropriate procedure when a problem does occur.

Aircraft today include a variety of indicators that provide signals or cues to the pilot when system problems occur. There are a number of ways that pilots can be notified of a problem. For example, many airplanes have what is known as a "master warning light panel". This panel has rows and columns of backlit capsules that remain dark until a fault condition occurs. When a fault condition occurs, the associated capsule illuminates and displays descriptive wording (often abbreviated) or indicia that references the fault condition. Additionally, a "master warning light" in the glareshield in front of both pilots also illuminates and flashes words like "Master Caution" until it is reset by a flight crewmember.

Depending on the problem and on the standard of the aircraft manufacturer, the capsules may illuminate in different colors, for example, red or amber light. Red generally indicates a warning or emergency and is the most serious type of message requiring a prompt action. Amber generally indicates an abnormal condition and is less serious but requires a corrective action when time permits.

Other cockpit lights can illuminate to either support the lights in the master warning light panel or operate as standalone system warning lights. Additionally, individual instruments can include flags that are usually located in the instruments that are viewed most often by the pilots and indicate the quality of the information that is provided by the given instrument.

Newer aircraft have what is known as a "glass cockpit" or "partial glass cockpit." Instead of a master warning light panel and other mechanical instruments, a cathode ray tube (CRT) display is used. These CRT displays include a messaging system that can display much of the information a pilot needs to operate an airplane: status of flight instruments, navigation systems, as well as engine and other system information. Typically, one or two CRT displays are mounted in front of each pilot. System CRTs are mounted between the pilots' CRTs on the instrument panel, and display engine and system information. When a system is having a problem, a message is displayed on a System CRT, which also illuminates and flashes the master warning light in the glareshield. The message on the CRT can illuminate in one of several colors, depending on the seriousness of the problem and the standard of the aircraft manufacturer. For example, one aircraft manufacturer has messages that illuminate in red, yellow or blue. In this case, red generally indicates a warning or emergency and is the most serious type of message requiring a prompt action. Yellow generally indicates a caution and is less serious but requires timely corrective action. Blue generally indicates an advisory condition that requires a corrective action when time permits.

The master warning lights, other cockpit lights, messaging system, and flags are all examples of direct visual signals provided to the pilot regarding the existence of a fault condition.

There are other types of signals that provide the pilot with information regarding the existence of a fault condition. For example, other cockpit instruments, aircraft movement, and flight control pressures also provide signals to the pilot regarding the existence of a fault condition. As used herein, these types of signals are denoted nonvisual. For example, if an engine were to cease functioning, the instruments that display the engine pressure would indicate less than when the engines are properly functioning, the nose of the aircraft would move in the direction of the failed engine, and pressure would be felt in the rudder pedals caused by the turning plane. In other words, a fault condition such as engine failure does not directly use lights, messages, or flags to indicate the failure, but other signals within the cockpit provide information to the pilot regarding the existence of such a condition.

Thus, a variety of ways exist for information regarding various aircraft conditions to be communicated to the pilot. As mentioned, an emergency procedures manual is meant to provide important information to the pilot regarding both the identification of a fault condition, the location of the appropriate fault procedure within the manual corresponding to the fault condition, and the presentation of the appropriate procedure steps in a logical manner.

Various problems exist with prior art emergency procedure manuals. For example, generally the only way of locating the fault procedure corresponding to a fault condition associated with a nonvisual signal is to use a procedure locating section such as an index. However, in most manuals, fault conditions associated with both visual and nonvisual signals are grouped together in the same index. Procedures that correspond to a fault condition associated with a visual signal, such as a condition associated with an illuminated cockpit light, need not be co-located with nonvisual procedures in a common index, so the grouping of visual with nonvisual fault conditions creates an unnecessarily large and inefficient index.

Further, in the index of many manuals, the hierarchical nature of the entries is not evident. For example, often words indicative of aircraft systems or words indicative of some fault condition are repeated many times and get in the way of identifying other key words of an entry in the index. FIG. 1, for example, illustrates the index of a prior art manual. For example, under the "ENGINE/APU" heading, the words "ENGINE" and "FAILURE" are repeated many times.

Using an index as the primary method for finding a procedure corresponding to a fault condition associated with a visual signal is also inefficient. Doubt often exists when a crewmember has to effectively translate from a visual indication of an aircraft problem (such as a backlit warning light) to a different written text description of that problem in the index. The crewmember wonders if the correct translation has been made and if the correct procedure for the given fault condition has been located. A procedure locating section that includes a graphical representation of each warning light on the master warning light panel is a helpful step in being able to efficiently locate the appropriate procedure associated with a warning light.

Some prior art manuals do contain graphical representations of the capsules in the master warning light panel with associated locator symbols that indicate the location of an appropriate fault procedure. However, so far cockpit lights other than those on the master warning light panel have not been graphically represented in the procedure locator section. With such a prior art manual, if one of these other cockpit lights were illuminated, the pilot would have to determine which written text description in the index describes the associated fault condition, again having to make the mental translation from a backlit warning light to a different written text description.

Additionally, as shown in FIG. 2, one prior art locator page includes multiple locator symbols (6, 7, 8) next to the graphic representation of two different warning lights (LGEN and R GEN). These locator symbols each reference a different fault procedure. This adds to pilot confusion and stress because it is unclear how to select among the referenced procedures when one of these warning lights is illuminated.

Another problem with various aircraft emergency manuals is they contain multiple index pages for separately listing fault conditions for each different major aircraft system. For example, fault procedures are divided into sections corresponding to electrical, hydraulic, or fuel problems with each section having its own index. Locating the corresponding fault procedure for a given fault condition then requires a pilot to first determine the proper system to which a light or message relates, and then find the appropriate index for that system. This is time-consuming and inefficient.

With respect to the procedures themselves, often a single procedure will be presented over a number of pages in the emergency manual. As much as possible, all procedures should be on a single page.

Another problem with prior art manuals occurs when another procedure is referenced within a first procedure and the location of the referenced procedure is not specified. For example, FIG. 3 illustrates a portion of a prior art manual illustrating a procedure titled "ENGINE HOT". Item 5 includes a step "Complete Engine Failure Checklist", but without a reference to the location of that procedure.

Various ways currently exist to present a fault procedure to crewmembers, all of which lack a standard way of presenting the various procedure elements. For example, conditional statements and procedure logic is often not presented in a standard manner. When conditional statements are not presented effectively, procedure steps could be read multiple times or parts of the procedure that might apply because a certain condition is met may actually be ignored. Additionally, the dominance of certain steps to others may be important but not clearly indicated. Other procedure elements such as warnings, cautions, and notes may not be directed to the step to which they relate, but are instead tacked on at the end of a procedure. Also, the performance of the steps of a procedure may reach a point where there is no need to perform any additional steps, but this point is not clearly indicated.

In addition, most current procedure manuals do not use key words, color or icons to identify key procedure elements. Presentation of information that is critical to aircraft safety is often presented in an ineffective manner.

SUMMARY OF THE INVENTION

It is an object of the present invention to provide a fault analysis guide that segregates the fault conditions associated with visual and nonvisual signals into separate locator sections. Additionally, the hierarchical nature of entries in the nonvisual locator section is made evident. A graphical depiction of the master warning lights, as well as other cockpit warning lights, in the same orientation as they exist on various display panels in the cockpit, are provided in the visual locator section. Alternatively, graphical depictions of messages from a messaging system are provided in the visual locator section. Further, when multiple locator symbols are used next to a graphical depiction of a warning light in the locator section, additional designators are provided to aid in the selection of the appropriate procedure. Also, when a first procedure references or calls another procedure, the location of the referenced procedure is provided. These measures aid crewmembers in the efficient location of fault procedures corresponding to given fault conditions.

A standard way of presenting various procedure elements within a procedure is described. The use of conditional statements within a procedure is described, including the use of key logical words and ending designators. Standard use of color, font, stroke, and various icons to identify key procedure elements allows the structure of a procedure to be instantly evident and aids the pilot in the ultimate performance of the fault procedure.

Other features and advantages of the invention will become apparent to those skilled in the art upon review of the following detailed description, claims, and drawings.

BRIEF DESCRIPTION OF THE DRAWINGS

FIG. 1 illustrates the index of a prior art emergency procedure manual;

FIGS. 7–13 illustrate procedure locator section pages from a fault analysis guide;

FIGS. 14–15 illustrate visual procedure locator section pages for a CRT messaging system;

FIG. 16 illustrates a page of a fault analysis guide including two titled fault procedures;

FIG. 17 illustrates a page of a fault analysis guide including non-titled fault procedures;

FIG. 18 illustrates a page of a fault analysis guide including various other fault procedures;

FIG. 19 illustrates a fault procedure including a reference to an aircraft service change;

FIG. 20 illustrates a fault procedure including a reference to a circuit breaker and specifying the location of the circuit breaker within the cockpit;

FIG. 21 illustrates a reference page showing the locations of the circuit breakers by panel and row and column; and FIG. 22 illustrates a fault procedure corresponding to the LANDING GEAR FAILURE TO RETRACT fault condition.

Figure 2:
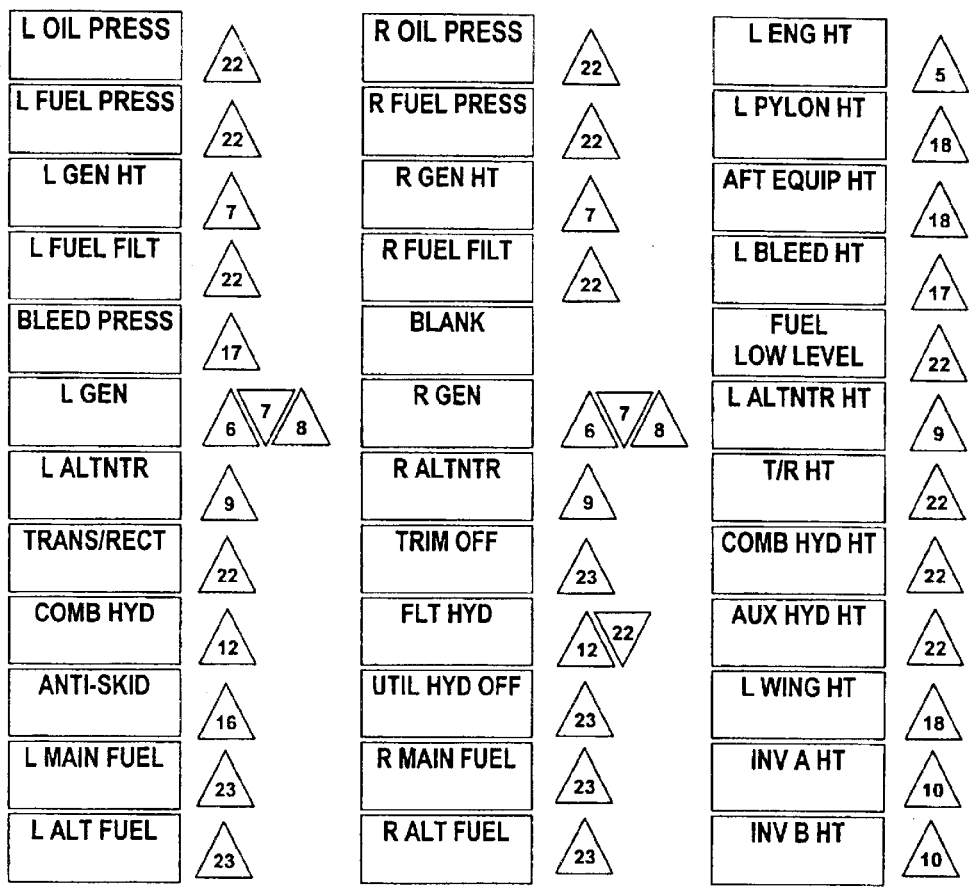
FIG. 2 illustrates a visual locator page in a prior art emergency procedure manual.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE INVENTION

Figures 3, 4:
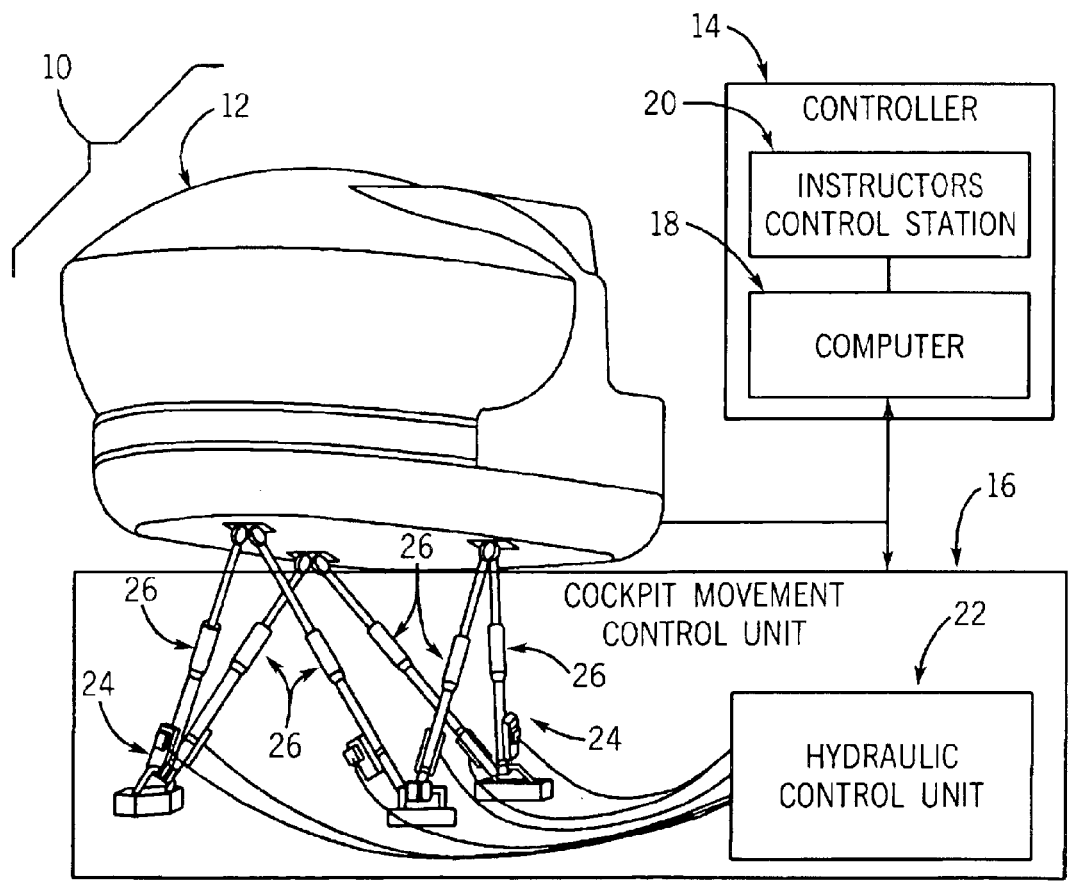
FIG. 3 illustrates a prior art fault procedure including a reference to another procedure.
FIG. 4 illustrates an electronic aircraft flight simulator.

Illustrated in FIG. 4 is an electronic aircraft flight simulator 10 including a cockpit 12, a controller 14, and a cockpit movement control unit 16.

The controller 14 interfaces with the cockpit 12 and the cockpit movement control unit 16 and includes a computer 18 and an instructor's control station 20. The controller 14 operates to generate a plurality of simulated aircraft conditions that have been selected by an instructor at the instructor's control station 20. Some of the simulated aircraft conditions can be visually presented to the pilot through the cockpit windows and include the likeness of most major airports, weather conditions, and day/night conditions. Various other simulated aircraft conditions relate to the movement of the cockpit, indications expressed on various gauges, or a plurality of various fault conditions. Some fault conditions are indicative of physical error conditions in the various control systems of the simulated aircraft.

Movement of the cockpit is accomplished by the controller 14 providing signals to the cockpit movement control unit 16. The cockpit movement control unit 16 preferably includes a hydraulic control unit 22, hydraulic motion control valves 24, and 3-axis motion hydraulic cylinders 26 that move the cockpit in an appropriate manner.

Figure 5:
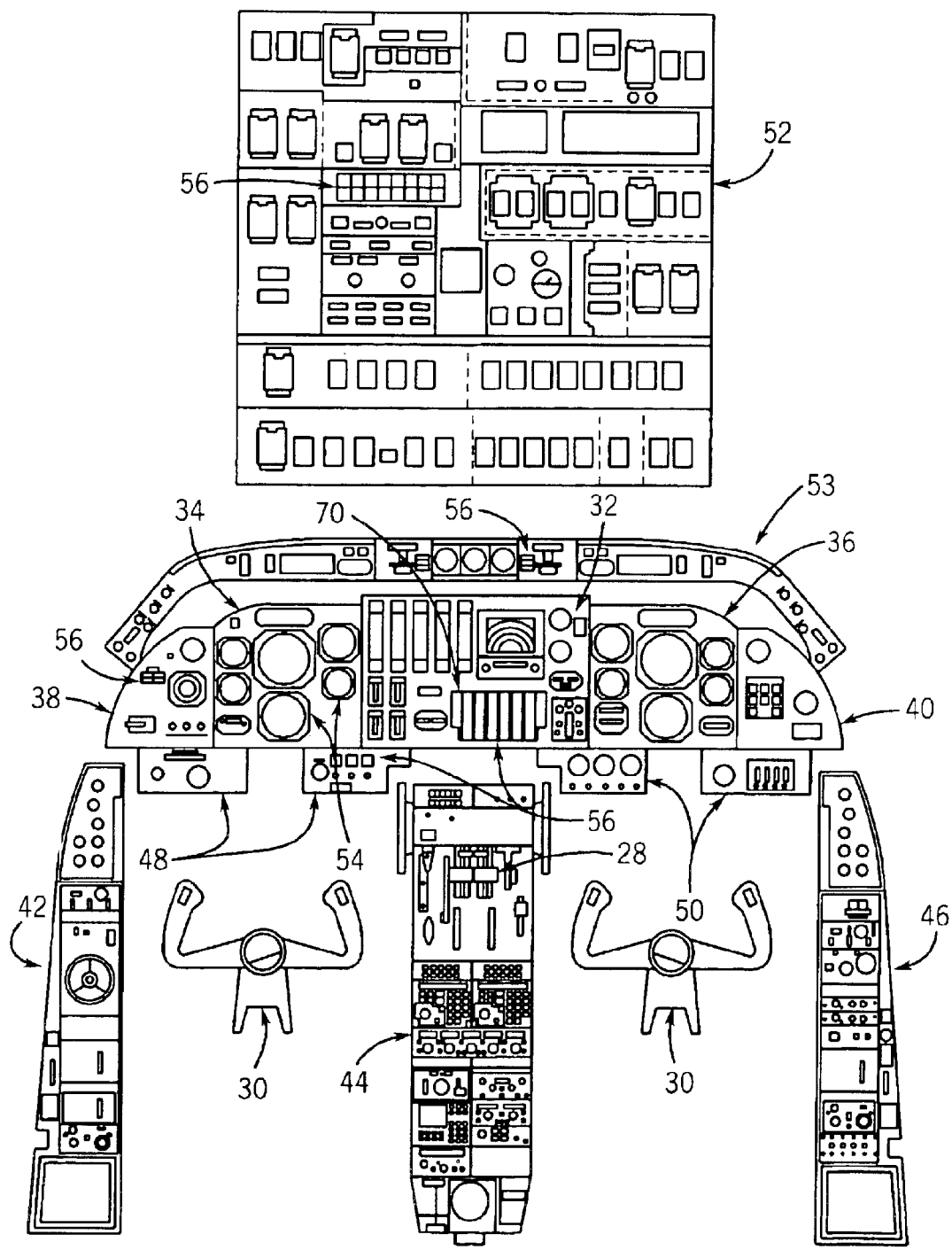
FIG. 5 illustrates a cockpit with controls and display panels and having a master warning light panel.

The interior of the cockpit is designed to look exactly like the aircraft it simulates and includes a plurality of aircraft simulator controls. As shown in FIG. 5, these aircraft simulator controls can be manipulated by the pilot and include an engine throttle 28 and yoke 30, various switches (toggle, rocker and push button) and other control devices to simulate control of the ailerons, rudder, elevator, flaps, landing gear, spoilers/speedbrakes, and flight control trim systems.

The cockpit also includes a plurality of display panels such as the center instrument panel 32, pilot instrument panel 34, copilot instrument panel 36, pilot auxiliary flight panel 38, copilot auxiliary flight panel 40, pilot side console panel 42, control pedestal panel 44, copilot side console panel 46, pilot skirt panels 48, copilot skirt panels 50, glareshield panel 53, and overhead panel 52. The display panels include a plurality of gauges 54 (flight, navigation, engine and aircraft control system instruments) and a plurality of indicators 56 that are indicative of various simulated aircraft conditions.

As illustrated, a master warning light panel 70 is located on the center instrument panel 32 and includes rows and columns of rectangular-shaped indicators 56 that remain dark until a fault condition occurs. The other display panels 34–52 include additional indicators. Preferably, the indicators include indicia such as abbreviated words referencing an associated fault condition. When a fault condition occurs, one or more indicators are illuminated and provide a visual signal of the associated fault condition. Depending on the nature of the fault condition, an indicator on the master warning light panel 70 may illuminate in red or amber light, or another color representative of a fault condition. Red generally indicates a warning or emergency and is the most serious type of message requiring a prompt action. Amber is less serious but requires timely corrective action.

Figure 6:
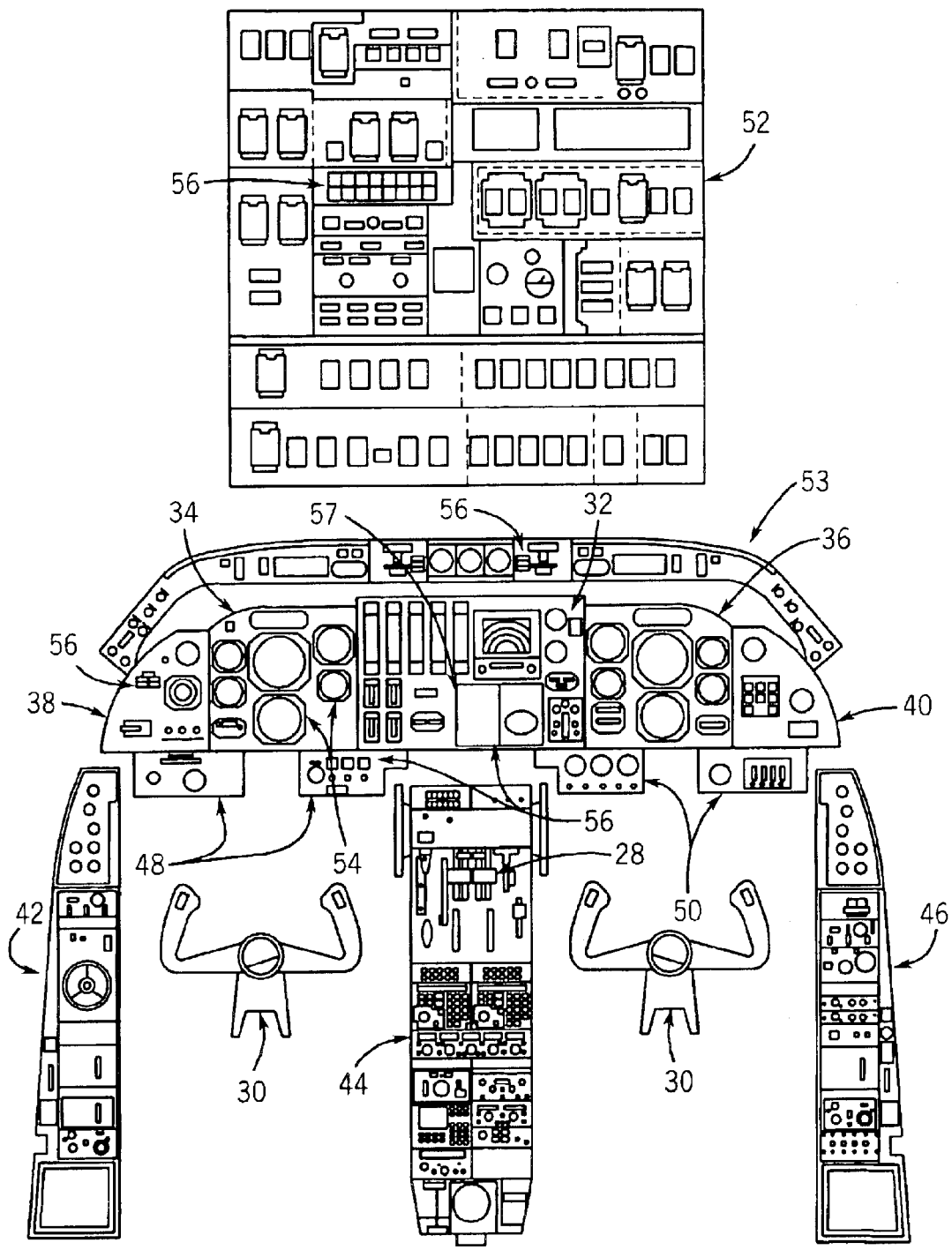
FIG. 6 illustrates a cockpit with controls and display panels and having a messaging system.

In an alternative embodiment, illustrated in FIG. 6, the center instrument panel includes, instead of a master warning light panel, a CRT display 57, which provides a messaging system providing illuminated messages referencing an associated fault condition. In this case as well, a visual signal indicative of an associated fault condition is provided by the messaging system. Various messages appear on the CRT display in various colors, depending on the nature of the fault condition.

In operation, the controller 14 provides simulated aircraft conditions to the cockpit 12, under the direction of an instructor at the instructor's control station 20. The computer 18 sends signals to the cockpit movement control unit 16 and to various display panels 32–52 in the cockpit 12. The computer 18 also receives control signals from the cockpit 12 based on the pilot's manipulation of the cockpit controls. The computer 18 determines appropriate feedback output signals that are sent to the associated control systems of the aircraft flight simulator, to gauges, and to other indicators such as warning lights. The computer 18 also sends further control signals to the hydraulic control unit 22, which directs hydraulic pressure to the respective hydraulic motion control valves 24 to change the extension of the hydraulic cylinders 26 based on the pilot's manipulation of the cockpit controls. The computer 18 also receives specific input from the instructor's control station 20 throughout the training period to vary the simulated aircraft conditions.

As an example, when the pilot opens a fuel valve control device during a normal engine start, the computer 18 responds by sending a signal to the fuel flow gauge denoting the corresponding fuel flow, sending a signal to the exhaust gas temperature gauge to denote the temperature, and sending a signal to the turbine RPM gauge to denote a rising RPM, all of which simulate aircraft conditions.

At any time, an instructor at the instructor's control station 20 can select from a plurality of simulated aircraft conditions that are executed by the computer 18 to change any simulated aircraft conditions. For example, if an instructor selects that an abnormal engine start be simulated, the computer 18 would provide a signal to the gauges to indicate that either no fuel is flowing or too much fuel is flowing. Additionally, the exhaust gas temperature gauge may indicate an excessive temperature or no temperature at all. The turbine RPM gauge may indicate no RPM or an overspeed condition with a high RPM indication.

In another example, the instructor may select that an engine failure be simulated. The computer 18 responds with the appropriate engine indications and provides signals to the hydraulic control unit 22 to hydraulically adjust the simulator motion to emulate a yaw motion toward the failed engine. With the cockpit 12 yawed, the computer 18 sends a signal to the display panels and rudder, which would indicate a yaw to the pilot. The pilot responds to the conditions he sees on the display panels as well as feels in the simulator, identifies any fault conditions, and responds with the performance of corresponding fault procedure steps (by the manipulation of the cockpit controls) to correct the fault conditions. The computer 18 continuously receives feedback from the cockpit and adjusts the simulated aircraft conditions in response to the actions of the pilot.

If programmed into the computer 18, the instructor can introduce any problem in the flight simulator that is associated with the aircraft. All flight simulator operations involved with training can be recorded by the computer 18 and observed by the instructor. The instructor's job is to train and test the pilots under a variety of simulated aircraft conditions in order to assess proficiency in proper flying techniques, problem recognition and the execution of appropriate procedures.

When an abnormal or fault condition is present, the pilot usually recognizes the problem through one of the following signals:

1. A light illuminated on the master warning light panel,
2. A light illuminated on another cockpit light panel,
3. Instrument Flags,
4. A message displayed on a CRT display, or
5. Mechanical indications including indications on gauges or other instruments.

This invention classifies items 1–4 above as visual signals. These visual signals are provided to the pilot and signal the existence of a fault condition. Item 5 is denoted a nonvisual signal.

A fault analysis guide includes a fault procedures section printed with a plurality of fault procedures each corresponding to one or more fault conditions. For a given fault condition, the pilot needs to locate the corresponding fault procedure and perform any procedure steps listed in the fault procedure. Therefore, the fault analysis guide also includes a procedure locator section to find the location of a corresponding fault procedure. In the preferred embodiment, the fault analysis guide is divided into several different locator sections: a primary visual procedure locator section (as shown in FIGS. 10–13), a nonvisual procedure locator section (shown in FIG. 7), and a secondary visual procedure locator section (shown in FIGS. 8–9).

The primary visual procedure locator section contains entries that are mutually exclusive to the entries in the nonvisual procedure locator section. When a visual signal from an indicator or a messaging system indicates the existence of a fault condition, preferably the primary visual procedure locator section is used to find the location of an appropriate fault procedure to be performed by the pilot. When a nonvisual signal indicates the existence of a fault condition, the nonvisual procedure locator section is used to find the location of an appropriate fault procedure to be performed by the pilot.

In particular, several pages of the procedure locator section of the fault analysis guide of the present invention are illustrated in FIGS. 7–13. As shown in FIGS. 10–13, the primary visual procedure locator section includes printed indicator symbols that are arranged in the same general spatial orientation as the arrangement of the plurality of indicators on the various display panels. For example, FIGS. 10 and 11 illustrate printed indicator symbols representing the lights on the master warning light panel 70 and would be printed on two adjacent pages of the fault analysis guide. Each printed indicator symbol is graphically representative of a single warning light, having the same rectangular shape and the same indicia as a corresponding warning light. For example, the indicia "L OIL PRESS" on the indicator light on the control panel are the same as on the printed indicator symbol in the fault analysis guide. The font colors of the indicia on the printed indicator symbols match the color of the indicia on the indicators. The printed indicator symbols together are arranged in an array with similar rows and columns as the arrangement of the warning lights on the master warning light panel.

Additionally, as shown in FIGS. 12 and 13, the primary visual procedure locator section includes additional printed indicator symbols that are arranged in the same general spatial orientation as the arrangement of a plurality of indicators on various other panels in the cockpit 12. These other panels include the overhead panel 52, the glareshield panel 53, the pilot auxiliary flight panel 38, the center instrument panel 32, the pilot skirt panel 48, the copilot skirt panel 50, and the control pedestal panel 44. Each printed indicator symbol is graphically representative of a single light. In particular, each printed indicator symbol is the same general shape and includes the same colors and the same indicia as a corresponding light. The colors of the different printed indicator symbols are not illustrated in the black and white figures, but essentially look the same as the corresponding lights.

Although not specifically illustrated, flags on instruments can be illustrated on the locator pages in a similar manner.

Each printed indicator symbol in the primary visual procedure locator section of the fault analysis guide has an associated locator symbol next to it, preferably a number that specifies a tabbed page. The associated locator symbol indicates the location of an appropriate fault procedure in the fault procedures section of the fault analysis guide. Preferably, the locator symbols are printed in font colors such as red and amber that indicate the seriousness of the associated fault procedure. Preferably the locator symbols also include a black stroke. Stroke is the area or line around the perimeter of a character and can be useful to enhance the readability of colored words in a low lighting situation.

For example, in FIG. 10, next to the "L OIL PRESS" printed indicator symbol in the upper left-hand corner, is the locator symbol "22" that would preferably be printed in amber font with a black stroke. This locator symbol references a tab 22 of the fault analysis guide. Tab 22 marks two adjacent pages of the fault analysis guide, one page of which includes a fault procedure including procedure steps that are to be performed by the pilot when the "L OIL PRESS" fault condition occurs.

To summarize, when a light in the master warning light panel or any other panel is illuminated, the pilot goes to the primary visual procedure locator page of the fault analysis guide for the appropriate panel and locates the printed indicator symbol that is the graphical representation of the illuminated light. The locator symbol adjacent to the printed indicator symbol indicates a numbered tab where a corresponding fault procedure is located in the fault analysis guide. The color of the locator symbol can indicate the type of procedure being referenced. For example, if the locator symbol is printed in red, this indicates that an emergency procedure is referenced.

Pilot stress associated with locating an appropriate fault procedure corresponding to an illuminated indicator on the display panel is thus greatly reduced when a graphical representation of that indicator is present. An effective translation from a visual indication of an aircraft problem (e.g., an illuminated light) to a written text description of that problem in an index of the guide is not necessary.

An example of a primary visual procedure locator section for a cockpit having a CRT and messaging system is shown in FIGS. 14 and 15. When the cockpit includes a messaging system, the visual procedure locator section includes an image of a CRT screen having an alphabetized list of the various messages that can be displayed on the CRT. The alphabetized list is segregated into portions corresponding to letters of the alphabet with each portion captioned by a letter of the alphabet. The various messages are graphically represented with the same abbreviations and indicia that are displayed on the CRT. Although not specifically shown in the black and white figures, the messages are printed in various font colors corresponding to the seriousness of the procedure and the standard of the aircraft manufacturer. For example, red indicates a warning, yellow or amber a caution, and blue an advisory.

A locator symbol is associated with each of the various messages and is printed in the same color as the associated message. The locator symbols in this case are printed to the right of the messages and indicate the tabbed page where the corresponding fault procedure is located. The locator symbols are placed in either a first or a second column next to the messages depending on whether the message references a titled or a non-titled procedure. A titled procedure is illustrated in FIG. 18, and includes a procedure title. Several non-titled procedures are illustrated in FIG. 17. The non-titled procedures are grouped by tabs in the fault analysis guide under tab designations such as "Warning", "Caution" and "Advisory". The titled procedures are grouped in the fault analysis guide according to the different aircraft systems, each of which is marked by a tab. This segregation process makes it easier for pilots to visually identify procedure locations in the fault analysis guide.

The nonvisual procedure locator section is illustrated in FIG. 7. Segregating the entries in the visual procedure locator section from those in the nonvisual procedure locator section allows the nonvisual procedure locator section to be smaller and more manageable. The nonvisual procedure locator section includes an alphabetized list of text descriptions of various physical error conditions that are mutually exclusive to fault conditions that are associated with the plurality of indicators of the display panels. The list is in a hierarchical format that includes a first level identifying the various control systems for the simulated aircraft by key words such as ENGINE, HYDRAULICS, etc. Key words identifying the various control systems that would normally be repeated in a prior art index are in bold typeface, are used only once, and do not have an associated locator symbol. Duplicate words are thereby eliminated. A second level, preferably indented from the first level, separately lists the various text descriptions of physical error conditions for each control system. A third further indented level may also be included to eliminate duplicate words in the second level. Each description of a physical error condition has an associated locator symbol indicating the location of an appropriate fault procedure in the fault procedures section of the fault analysis guide. Preferably, the locator symbols are printed in different font colors like red and amber to indicate the seriousness of an associated fault procedure, and are printed with a black stroke to enhance readability.

Illustrated in FIGS. 8 and 9 is the secondary visual procedure locator section. This section includes a list of fault conditions associated with the indicators on the warning light panel and the other display panels that are included in the primary visual procedure locator section. The list is in a hierarchical format that includes a first level identifying the various control systems for the simulated aircraft by key words such as AC ELECTRICAL, ENGINE, HYDRAULICS, etc., and a second level, preferably indented from the first level, that separately specifies the descriptions of the indicators for each separate control system. Key words identifying the various control systems that would normally be repeated in a prior art index are in bold typeface, are used only once, and do not have an associated locator symbol. Duplicate words are thereby eliminated.

Each fault condition in the secondary visual procedure locator section has an associated locator symbol indicating the location of an appropriate fault procedure in the fault procedures section. The locator symbols are printed in different font colors to indicate the seriousness of an associated fault procedure, and are printed with a black stroke to enhance readability. This secondary visual procedure locator section is not preferred for seeking the location of a fault procedure due to its inefficiency as compared to the use of the primary visual procedure locator section, which requires visual matching. When using the secondary visual procedure locator section, the crewmember wonders if a correct translation from the visual indicator to the description of the associated fault condition has been made. For example, the indicia on a warning light are "L ALTNTR HT". This corresponds to a text description of "ALTERNATOR HOT" in the secondary visual procedure locator section.

Note that for all locator symbols in the procedure locator section, the locator symbol designates a tabbed page of the fault procedures section. The tabbed page includes the appropriate fault procedure.

In some cases, more than one locator symbol is associated with a single printed indicator symbol. In this case, various designators are used in conjunction with the locator symbol to indicate under which conditions a single locator symbol should be selected. For example, as shown in FIGS. 10 and 11, a bridging symbol designator is used to link two (usually adjacent) printed indicator symbols such as "L GEN" and "RGEN". In this case, if the two indicators graphically depicted by the two bridged printed indicator symbols are illuminated at the same time, then the locator symbol above the bridging symbol would be used to locate the appropriate fault procedure. Similarly, an asterisk may be used as a designator to link two printed indicator symbols (that are usually not directly adjacent) such as "L GEN" (in FIG. 10) and "L DC FEEDER" (in FIG. 11). In this case, if the two indicators graphically depicted by the two printed indicator symbols are illuminated at the same time, then the locator symbol having an asterisk associated therewith would be used to locate the appropriate fault procedure. If only one of the indicators is illuminated, then the locator symbol without the asterisk that is next to the associated printed indicator symbol would be used to locate the appropriate fault procedure.

In particular, referring to FIGS. 10 and 11, the printed indicator symbols "L GEN" and "R GEN" are linked by a bridging symbol having the locator symbol "8" printed directly above. Also, next to both printed indicator symbols are the locator symbol "6" and locator symbol and designator "7*". This means that if the indicator "L GEN" is illuminated at the same time as the indicator "R GEN", then the locator symbol "8" indicates that the appropriate fault procedure is located at Tab 8. If the indicators "L GEN" and "L DC FEEDER" are both illuminated, or if the indicators "R GEN" and "R DC FEEDER" are both illuminated, then the locator symbol and designator "7*" indicates that the appropriated fault procedure is located at Tab 7. If only the indicator "L GEN" is illuminated, then the locator symbol "6" indicates that the appropriate fault procedure is located at Tab 6.

Another way that various designators are used in conjunction with a locator symbol to designate a selection between procedures is when the designators are locator symbols that are printed in different font colors. For example, referring to FIG. 11, the printed indicator symbol "CABIN PRESSURE LO" has the locator symbols "17" and "23" located adjacent thereto. Although not illustrated in the black and white drawing that is FIG. 11, preferably "17" is printed in a red font and "23" is printed in an amber font. The selection of the appropriate locator symbol then depends on the seriousness of the aircraft problem. For an emergency situation, the pilot would proceed to the fault procedure at Tab 17, and for a less serious situation, the pilot would proceed to the fault procedure at Tab 23.

FIGS. 16–20 illustrate various pages of the fault analysis guide printed with a plurality of fault procedures. Preferably, the fault procedure pages include protruding numbered tabs, and/or page numbers. Each fault procedure corresponds to a fault condition and describes a specified operation to be performed by the pilot when that particular fault condition exists. Each fault procedure includes a number of procedure elements including one or more procedure steps and an ending designator. Each fault procedure may also include various optional items, including a procedure title; critical text; key logical words; action items and informational items; informational indications such as warnings, cautions, and notes, aircraft service changes and circuit breaker references; and procedure calls. As much as possible, a fault procedure is printed on a single page. If a procedure extends across more than one page, a <Continued on Next Page> statement is placed at the bottom of the first page.

The use of various colors in conjunction with a few of the procedure elements is preferred. Color physiologically stimulates the pilot to the importance of what is being communicated and allows the pilot to visually obtain a general feel for the procedure. The use of color is tied to pilot associations that already exist with a specific aircraft. For example, color in the aircraft cockpit already has great significance to the pilot. Well-known colors include red, yellow, amber and green. In general, red identifies extreme or critical problems that must be resolved as soon as possible, yellow identifies the next level of problems that should be accomplished in a timely manner, and amber or another color such as blue identifies the lowest level of problems that should be accomplished when time permits. Green identifies a safe or normal condition. The color associations may be slightly different depending on the standards of a specific aircraft manufacturer or airline.

The use of text color in the fault analysis guide is important to emphasize and make certain information readily apparent. The use of different fonts, font sizes, font colors and stroke also provides important visual structure to the fault procedures. Although the use of color is important, more important is the strategic use of color so that color does not dominate the fault procedure. In other words, there must be a balance between procedure readability and element identification.

In the fault analysis guide, some fault procedures are titled, as shown in FIG. 16, and some are non-titled, as shown in FIG. 17. FIG. 16 illustrates two titled fault procedures: "ENGINE FIRE" and "SINGLE-ENGINE LANDING". Preferably, each titled fault procedure includes a procedure title designating the name of the procedure, printed in a color depending on the classification or seriousness of the fault procedure. For example, Gulfstream classifies its fault procedures as emergency or abnormal. Northwest classifies its fault procedures as warning, caution, or advisory. In the preferred embodiment, the procedure title is printed in a black font and the stroke varies in color depending on the classification of the procedure. Emergency or warning procedures include a red stroke; abnormal or advisory procedures include an amber stroke; caution procedures include a yellow stroke. In FIG. 16, ENGINE FIRE is the procedure title, and is printed in black font with a red stroke, indicating an emergency.

For those fault conditions that have an indicator on a display panel that is associated with that fault condition, the fault procedure includes a printed indicator symbol of the associated indicator. For example, in FIG. 16, the printed indicator symbols "L FIRE PULL" and "R FIRE PULL" are included next to the procedure title. In FIG. 17, a non-titled fault procedure, the various printed indicator symbols are used without a corresponding procedure title.

Each fault procedure includes one or more procedure steps. In most cases, the procedure steps are numbered consecutively in the order in which they are to be performed. However, various key logical words or conditional statements in fault procedures may have an effect on the step numbering, as discussed below.

A fault procedure may include certain steps that need to be recalled by a pilot from memory. These steps are preferably designated with a black border printed around them, or with a gray background. For example, in FIG. 16, steps 1–4 are memory steps that are indicated as such by a black border surrounding these steps. Marking the memory steps in such a fashion is a standard practice in the aviation industry.

Often, a procedure step includes much information that is better presented by segregating it into limitations, informational items and action items, and marking these graphically with icons. An action item is a procedure element that should be observed or complied with. An informational item indicates information relative to the procedure or a procedure step. A limitation is an aircraft limitation from the Aircraft Flight Manual. Preferably, these items are indented with respect to the procedure step. For example, the icon ">" designates an action item, and the icon "•" designates an informational item, and the icon "✦" designates a limitation. As shown in FIG. 16, the following is an action item: "> Select engine bleed air OFF on affected engine." The following is an informational item: "• There is no need to shut down the engine." An example of a limitation is "

✦ Departure into known icing conditions is prohibited."

Some fault procedures include the use of key logical words to identify conditional statements and to direct the procedure flow. Preferably, the key logical words are generally presented in a larger font than the procedure steps, and are presented in a selected font color Such as blue. Key logical words include IF, THEN, ELSE, WHEN, CASE, AND, OR, GOTO, BEFORE, ALLOW, and PRIOR. Any other word that identifies a conditional statement or directs the procedure flow is considered a key logical word.

A conditional statement is a logical statement that tests either TRUE or FALSE and has a key logical word such as IF placed before the statement and a key logical word such as THEN after the statement. If the statement tests TRUE, a statement after the THEN key word may be used to indicate a procedure element to follow. If the statement tests FALSE, then an ELSE may be used to indicate an alternative procedure element to follow. Multiple conditional statements can have an AND or OR key word placed between the two conditions. The AND indicates that both conditions must be true before proceeding to the action item after the THEN. The OR indicates that if either condition is true, then the procedure proceeds to the action item after the THEN. The key word CASE may be used when there are more than one TRUE option or a group of options to select from. BEFORE, PRIOR and ALLOW set the logical ordering of action items. The GOTO key logical word is used to control procedure flow and jump to other procedures.

Organizing a fault procedure using key logical words forces the consideration of each conditional statement and leads to a better understanding of the procedure flow and which procedure steps or action items should be performed.

An if/then/else format for a fault procedure includes an 'if' portion of the procedure that begins with the word "IF" and indicates a specific aircraft condition, a 'then' portion of the procedure that begins with the word "THEN" and includes a specified operation to be performed by the pilot in the event the specific aircraft condition exists, and wherein an 'else' portion of the procedure begins with the word "ELSE" and includes an alternative operation to be performed by the pilot in the event the specific aircraft condition does not exist.

In addition to the use of key logical words, the use of indenting in a fault procedure may be used to illustrate the dominate/subordinate relationships of procedure steps. As shown in FIG. 16, the use of indenting provides a visual indication of the structure of a fault procedure.

For example, all items subordinate to the first IF/THEN aircraft condition are indented to the right. Similarly, all items subordinate to the ELSE key word are indented to the right. When a second IF/THEN condition is embedded within a first IF/THEN condition, then multiple indentation is used, as shown.

If a conditional statement is used in association with a numbered step, the step should be completed in sequence only if it meets the terms of the condition. At times a numbered step may be assigned twice in a conditional statement. In this case, only one of the two steps should be completed. For example:

IF Reverser not stowed THEN
   5. Reduce airspeed . . . 170 KCAS
ELSE
   5. Resume normal speed
   6. Flight Hydraulic Control Circuit Breaker . . . PULL There are two step 5's, but obviously only one of them is performed.

Thus, if the reverser is not stowed, then the airspeed should be reduced to 170 KCAS. If the reverser is stowed, then normal speed should be resumed, and the hydraulic control circuit breaker should be pulled.

Critical text is defined as information or procedure steps that have a critical importance to the safe operation of the aircraft. Preferably, critical text is highlighted in bold, includes a black stroke, and a font color that distinguishes the seriousness of the text from the surrounding text. For example, the following critical text is presented having red font color with a black stroke in FIG. 18: "The T/R switch must remain in the ESS DC position to retain power."

A fault procedure may also include informational indications such as warnings, cautions and notes, as shown in FIGS. 16 and 18. As per industry standards, warnings are denoted by the word "WARNING" and include procedure steps or limitations, which if not followed, may result in personal injury or death. Cautions are denoted by the word "CAUTION" and include procedure steps or limitations, which if not followed, may result in damage to equipment or components. Notes are denoted by the word "NOTE" and include less critical information, or call attention to special conditions or procedures. These informational indications maintain the proper dominant subordinate relationship with any associated procedure steps. Additionally, each type of informational indication is printed in a selected font, font color, and stroke. For example, the word warning is printed having a red font and an amber stroke, the word caution is printed having a yellow font and an amber stroke, and the word note is printed having a gray font and an amber stroke.

Aircraft service changes (ASCs), also known as service bulletins (SB), are modifications that are either required by the aircraft manufacturer, or are options that are installed by the aircraft owner. At times, an ASC may affect how a fault procedure is handled by a crewmember. If an ASC does affect the performance of a fault procedure, the ASC is identified in the fault procedure by the word "ASC" or a similar contraction printed in a different font, font color and stroke. Further, a location is provided to indicate whether or not the particular ASC applies. For example, in FIG. 19, a reference is made to "ASC 199". If this applies, i.e., the aircraft is equipped with a single igniter ground start, then AIR START ON should be selected prior to attempting a subsequent engine start.

Circuit breakers operate to protect the electrical system of an aircraft. Some fault procedures involve various circuit breakers in the performance of procedure steps. As shown in FIG. 20, in the fault analysis guide, a fault procedure step may include a named circuit breaker that is indicated by a different font, font color and stroke. As shown in the fault procedure titled "ALTERNATOR FAILURE", at step 2, a procedure step includes the directions to check the copilot's CB panel. The names of the circuit breakers "L ALTNTR CONT" and "R ALTNTR CONT" are specified as well as their locations. The fault analysis guide also includes circuit breaker pages that specify the location of named circuit breakers, their panel locations and row and column numbers, as illustrated in FIG. 21.

A fault procedure may also include a procedure call, which is a reference to a second fault procedure embedded within the procedure steps of a first fault procedure. Preferably, the font and font color of the reference to the second fault procedure is different than the rest of the procedure steps. For example, the reference to the second fault procedure is printed in a larger green font to emphasize that it is a procedure call. Additionally, the location of that second fault procedure in the fault analysis guide is designated so that the pilot can quickly locate the second fault procedure. This is accomplished with the use of a locator symbol such as the number of a tab in bold typeface.

The fault procedures also include ending designators to provide notice of the end point of a procedure. Because pilots are trained to read procedures from beginning to end, if a procedure includes one or more conditional statements, it is often the case that the pilot will reach a point where there is no need to continue to read and perform additional procedure steps. Preferably, the word "FINISHED" is used within a conditional statement to notify the pilot that the procedure can be safely terminated at this point, so the pilot does not waste time reading parts of the procedure that do not apply. Additionally, when a procedure has reached its completion point, an "<END>" statement is used. These ending designators are both illustrated in FIG. 16. Preferably, the ending designators are printed in a different font, font color and stroke than the procedure steps. For example, both "FINISHED" and "<END>" are printed in an amber font color with a black stroke.

The fault analysis guide includes various tabs to designate various portions of the guide including the procedure locator sections and the fault procedure pages. In the preferred embodiment, the tabs for the fault procedure pages are arranged according to various aircraft systems, such as AC Electrical, Air-Conditioning, Auxiliary Power Unit, Communication, Engines, Fire, Fuel, etc. The fault procedures are grouped according to these categories. Alternatively, the tabs can be color-coded corresponding to the seriousness of the fault procedures and may include, for example, white lettering on a red or amber background.

The tabs associated with the procedure locator section include a tab denoting the nonvisual procedure locator section, a tab denoting the secondary visual procedure locator section, and a tab denoting the primary visual procedure locator section. For example, the present invention uses a reverse tabbed page with blue font on a white background to denote the nonvisual procedure locator section. A tab having white font on a blue background denotes the secondary visual procedure locator section, and the printed indicators representing the master warning panel lights have a tab that includes white font on a red background. The pages including printed indicators representing other lights have a tab that includes white font on an amber background. This insures readability and ease of use.

The following two examples illustrate how the fault analysis guide is used to train an aircraft pilot in a flight simulator. Both examples begin with the simulator on the ground, with the pilot and copilot having completed all the necessary preparations prior to departure. The instructor has set various simulated aircraft conditions including weather conditions and the visual display that the pilot views through the windows of the cockpit. The simulated conditions are either preset in the controller or manually introduced by the instructor at the instructor's control station. Simulated aircraft conditions also include interactions of the instructor acting as an air traffic controller. Information presented to the pilot in the cockpit includes the initial reading of clearances to destination, aircraft taxi, clearance for takeoff, changes in altitude, aircraft holding and any other information necessary to allow the pilot to be exposed to simulated fault conditions.

In the first example, shortly after the simulated takeoff, an illuminator designated as "R FIRE PULL" illuminates and the fire bell sounds to alert the pilot to a fault condition. The pilot identifies the fault condition as a right engine fire and proceeds to perform the first procedure steps associated with this fault condition from memory. The pilot manipulates the controls by positioning the Power Lever to IDLE. The computer responds by sending signals to the TGT, RPM, and Fuel Flow gauges indicating that the pilot has idled the engine.

The pilot then commands the copilot to complete the associated fault procedure. Knowing that the "R FIRE PULL" indicator is located in the glareshield, the copilot then proceeds to the primary visual procedure locator section and to the section for OTHER WARNING LIGHTS, (illustrated in FIG. 12). He then identifies the printed indicator symbol for the "R FIRE PULL" indicator and sees that the locator symbol indicates 2. He then finds the associated fault procedure at tab 2 of the fault analysis guide, as illustrated in FIG. 16.

Reviewing the fault procedure, the copilot notices that step 1 is the most dominate item in the procedure. The next procedure item is subordinated (indented to the right) and is a conditional IF statement asking if the fire warning light extinguishes with the power level at idle. If the condition is TRUE, procedure flow continues to the subordinated items after the THEN key word. After the THEN key word, the first item is an action item directing the testing of the fire warning system. Continued flow proceeds to a subordinated conditional IF statement asking if the system tests satisfactorily and if the other engine parameters are normal. If both conditions are TRUE, the THEN keyword continues procedure flow into an informational item that states that there is no need to shut down the engine. The next item is an action item directing the ENGINE air bleed to be turned OFF, and is of equal dominance to the informational item. When the Engine bleed air is selected to OFF, signals are sent to the computer to set the associated bleed air gauge to read zero. The key word FINISHED indicates that there is no need to continue after this step has been reached.

If the first conditional statement after Step 1 is FALSE, then procedure flow is directed to the first ELSE keyword. In this case, steps 2, 3, and 4 are performed. In particular, the HP Fuel Cock is SHUT, signaling the computer to shutdown the engine. The computer sends signals to the cockpit in response by setting windmilling RPM in the RPM gauge, setting the fuel flow gauge to zero, and setting an ever decreasing temperature in the TGT gauge. Next, the Fire T-Handle is PULLED, physically allowing the selection of the fire bottles and signaling the computer to accomplish various system functions. Finally, the No. 1 Fire Extinguisher is SELECTED, and a signal is sent to the computer, which responds accordingly.

After step 4, if the next subordinated conditional IF statement asking if the fire warning light is extinguished is true, then procedure flow continues with the items after the word THEN. In this case, the warning circuit is tested. If the next subordinated conditional IF statement is true, i.e., the light tests satisfactorily, the procedure flow continues with the items after the word THEN. In this case, the ENGINE FAILURE/SHUTDOWN procedure should be performed. This is a procedure call to another procedure located at tab 2. The ending designator FINISHED indicates that there is no need to continue after this.

If the conditional IF statement under step 4 is not true, then procedure flow continues with the steps after the key word ELSE IF. If the fire warning light does not test or remains illuminated for 30 seconds, then procedure flow continues with the steps after the word THEN. In particular, step 5, select No. 2 Fire extinguisher and step 6, the ENGINE FAILURE/SHUTDOWN procedure should be performed.

In a second example, after being cleared for takeoff, the flight crew applies standard operating procedures for departure. After the cockpit is rotated indicating to the flight crew that a positive rate of aircraft climb has been obtained, the pilot instructs that the landing gear be retracted. The copilot tries to position the landing gear selection handle in the retract position without success. This is an example of a nonvisual fault condition.

Knowing that there is no indicator that would provide a visual indication of such a fault condition, the copilot proceeds to the nonvisual procedure locator section, FIG. 7. He then looks under the HYDRAULICS section and finds LANDING GEAR, FAILURE TO RETRACT, and a locator symbol referencing tab 15. He recognizes it as being an emergency procedure, because the locator symbol is in a red font.

The fault procedure associated with the LANDING GEAR FAILURE TO RETRACT fault condition is illustrated in FIG. 22. This procedure includes two most dominant statements, Condition 1 and Condition 2. If the landing gear handle moves to the UP position, then the steps immediately following Condition 1 would be performed. In this case, Condition 2 is true in that the landing gear selection handle will not move from the DOWN position. The next IF/THEN statement is considered, which includes testing the lock release button. If pressing the lock release button allows the gear handle to be raised, then the pilot performs the two action items specified after the THEN key word. In particular, the ground spoiler switch is turned off, and a second fault procedure is referenced, i.e., the NUT-CRACKER SYSTEM FAILURE procedure, located at tab 21.

In summary, the pilot or copilot performs the appropriate fault procedure by manipulating the simulator controls. The controller electronically responds to the pilot's manipulation of the simulator control by providing the appropriate feedback signals to the gauges and indicators to determine if the pilot properly performed the appropriate fault procedure correctly.

In the preferred embodiment, the fault analysis guide itself is approximately six inches wide by 11 inches high and is bound by a nylon spine through a plurality of holes. Such a guide fits well on a pilot's leg in the cockpit allowing hands-free use, durability and easy page turning. The principles described relating to the procedure elements can also be applied to a reference card containing the most important emergency procedures.

Various features of the invention are set forth in the following claims.

What is claimed is:

1. A method of training an aircraft pilot to handle in-flight emergencies, the method comprising the steps of:

providing an electronic aircraft flight simulator configured to simulate an aircraft, the simulator including a cockpit and a controller interfacing with the cockpit, the controller including a computer, wherein the controller generates a plurality of simulated aircraft conditions including a plurality of fault conditions and including fault conditions indicative of physical error conditions for control systems of the simulated aircraft, the cockpit having a plurality of aircraft simulator controls and a plurality of display panels, the aircraft simulator controls including at least an engine throttle and a yoke, the plurality of display panels including a plurality of gauges indicative of simulated aircraft conditions, the display panels also including a warning light panel with a plurality of indicators each providing a visual signal indicative of an associated fault condition;

providing the pilot with a fault analysis guide, the fault analysis guide including a fault procedures section printed with a plurality of fault procedures each corresponding to a fault condition, the fault analysis guide also including a visual procedure locator section and a nonvisual procedure locator section, wherein the visual procedure locator section includes printed indicator symbols that are arranged in the same general spatial orientation as the arrangement of the plurality of indicators on the warning light panel, wherein each printed indicator symbol is graphically representative of a single indicator and has an associated locator symbol indicating the location of an appropriate fault procedure in the fault procedures section, and the nonvisual procedure locator section includes a list of the physical error conditions not associated with the plurality of indicators, wherein each physical error condition has an associated locator symbol indicating the location of an appropriate fault procedure in the fault procedures section;

electronically generating simulated aircraft conditions in the simulator;

identifying any fault conditions generated;

selecting either the visual procedure locator section or the nonvisual procedure locator section to locate an appropriate fault procedure for each identified fault condition, wherein the visual procedure locator section is selected if the fault condition is associated with a visual signal from an indicator on the warning light panel and the nonvisual procedure locator section is selected if the fault condition is indicative of a physical error condition;

performing the appropriate fault procedure by manipulation of the aircraft simulator controls; and electronically responding to the pilot's manipulation of the aircraft simulator controls as the pilot performs the appropriate fault procedure to determine if the pilot properly performed the appropriate fault procedure.

2. The method of claim 1, wherein the locator symbol for each printed indicator symbol is printed adjacent thereto and designates a tabbed section of the fault procedures section and wherein the tabbed section includes a fault procedure to be performed by the airplane pilot when the associated indicator provides a visual signal indicative of its associated fault condition.

3. The method of claim 1, wherein each locator symbol is printed in a font color selected from the group including red, yellow and amber.

4. The method of claim 3, wherein each locator symbol includes a black stroke.

5. The method of claim 1, wherein the list in the nonvisual procedure locator section is alphabetized according to the physical error conditions generated by the simulator.

6. The method of claim 1, wherein the list in the nonvisual procedure locator section is expressed in a graphical hierarchical format including a first level that identifies and alphabetizes the control systems of the simulated aircraft, and a second level indented from the first level that separately specifies the physical error conditions for each control system.

7. The method of claim 6, wherein duplicate words in the second level are eliminated with the addition of a third further indented level.

8. The method of claim 1, wherein the fault analysis guide further includes a secondary visual procedure locator section which includes a list of fault conditions corresponding to the plurality of indicators on the warning light panel wherein each listed fault condition has an associated locator symbol indicating the location of an appropriate fault procedure in the fault procedures section.

9. The method of claim 8, wherein each locator symbol designates a tabbed section of the fault procedures section.

10. The method of claim 8, wherein the list in the secondary visual procedure locator section is alphabetized.

11. The method of claim 8, wherein the list in the secondary visual procedure locator section is expressed in a graphical hierarchical format including a first level that identifies and alphabetizes the control systems of the simulated aircraft, and a second level indented from the first level that includes a separate list of the fault conditions associated with each control system.

12. The method of claim 1, wherein at least one fault procedure includes numbered procedure steps.

13. The method of claim 12, wherein the at least one fault procedure further includes designated informational items, limitations and action items.

14. The method of claim 1, wherein at least one fault procedure includes informational indications including warnings, cautions and notes.

15. The method of claim 14, wherein each type of informational indication is printed in a standard font color and stroke.

16. The method of claim 1, wherein a first fault procedure further includes a procedure call that references a second fault procedure and specifies the location of the second fault procedure within the fault analysis guide.

17. The method of claim 1, wherein each fault procedure is terminated with an ending designator.

18. The method of claim 1, wherein a fault procedure corresponding to a fault condition that has an indicator associated with that fault condition includes a printed indicator symbol that is a graphical representation of the associated indicator.

19. The method of claim 1, wherein at least one fault procedure is organized in if-then-else format, wherein an 'if' portion of the procedure indicates a specific simulated aircraft condition that may be generated by the simulator, wherein a 'then' portion of the procedure includes a specified operation to be performed by the airplane pilot in the event the specific simulated aircraft condition exists, and wherein an 'else' portion of the procedure includes an alternative operation to be performed by the pilot in the event the specific simulated aircraft condition does not exist.

20. A method of training an aircraft pilot to handle in-flight emergencies, the method comprising the steps of:

providing an electronic aircraft flight simulator configured to simulate an aircraft, the simulator including a cockpit and a controller interfacing with the cockpit, the controller including a computer, wherein the controller generates a plurality of simulated aircraft conditions including a plurality of fault conditions, the cockpit having a plurality of aircraft simulator controls and a plurality of display panels, the aircraft simulator controls including at least an engine throttle and a yoke, the plurality of display panels including a plurality of gauges indicative of simulated aircraft conditions, the display panels also including a master warning light panel with a plurality of indicators each providing a visual signal indicative of an associated fault condition, and a second panel with a plurality of indicators each providing a visual signal indicative of an associated fault condition;

providing the pilot with a fault analysis guide, the fault analysis guide including a fault procedures section printed with a plurality of fault procedures each corresponding to a fault condition, the fault analysis guide also including a visual procedure locator section including a first section and a second section, wherein the first section includes printed indicator symbols that are arranged in the same general spatial orientation as the arrangement of the plurality of indicators on the master warning light panel, and the second section includes printed indicator symbols that are arranged in the same general spatial orientation as the arrangement of the plurality of indicators on the second panel, wherein each printed indicator symbol is graphically representative of a single indicator and has an associated locator symbol printed adjacent thereto that designates a location of a fault procedure in the fault procedures section;

electronically generating simulated aircraft conditions in the simulator such that at least one indicator provides a visual signal indicative of an associated fault condition;

identifying the indicator providing the visual signal and the panel on which it is located and matching the indicator to a printed indicator signal in either the first section or the second section of the visual procedure locator section;

locating the appropriate fault procedure in the fault analysis guide using the locator symbol associated with the matched printed indicator symbol;

performing the appropriate fault procedure by manipulation of the aircraft simulator controls; and electronically responding to the pilot's manipulation of the aircraft simulator controls as the pilot performs the appropriate fault procedure to determine if the pilot properly performed the procedure.

21. The method of claim 20, wherein a first printed indicator symbol has a first locator symbol and a second locator symbol associated therewith, each locator symbol having a designator, each designator associated with at least one other fault condition, wherein the existence of the other fault condition determines which of the locator symbols is selected to locate the appropriate fault procedure.

22. The method of claim 21, wherein a designator is selected from the group including a bridging symbol and an asterisk.

23. The method of claim 20, wherein a printed indicator symbol has an associated first locator symbol printed in a first color and an associated second locator symbol printed in a second color, wherein the seriousness of a fault condition determines which of the locator symbols is selected to locate the appropriate fault procedure.

24. The method of claim 20, further including a nonvisual procedure locator section that includes a list of fault conditions not associated with the plurality of indicators, and the nonvisual procedure locator section is used to locate an appropriate fault procedure if the generated fault condition is not associated with one of the plurality of indicators.

25. The method of claim 24, wherein the locator symbol for each printed indicator symbol is printed adjacent thereto and designates a tabbed section of the fault procedures section.

26. The method of claim 25, wherein each locator symbol is printed in a font color selected from the group including red, yellow, and amber.

27. The method of claim 26, wherein each locator symbol includes a black stroke.

28. The method of claim 24, wherein the list in the nonvisual procedure locator section includes fault conditions indicative of physical error conditions, and the section is alphabetized according to the physical error conditions.

29. The method of claim 24, wherein the list in the nonvisual procedure locator section includes fault conditions indicative of physical error conditions, and the list is expressed in a graphical hierarchical format including a first level that identifies and alphabetizes the control systems of the simulated aircraft, and a second level indented from the first level that separately lists the physical error conditions for each control system.

30. The method of claim 29, wherein duplicate words in the second level are eliminated with the addition of a third further indented level.

31. The method of claim 20, wherein the fault analysis guide further includes a secondary visual procedure locator section that includes a list of fault conditions corresponding to the plurality of indicators on the master warning panels and the second panel wherein each listed fault condition has an associated locator symbol indicating the location of an appropriate fault procedure in the fault procedures section.

32. The method of claim 31, wherein each locator symbol designates a tabbed section of the fault procedures section.

33. The method of claim 31, wherein the list in the secondary visual procedure locator section is alphabetized.

34. The method of claim 31, wherein the list in the secondary visual procedure locator section is expressed in a graphical hierarchical format including a first level that identifies and alphabetizes the control systems of the simulated aircraft, and a second level indented from the first level that includes a separate list of the fault conditions associated with each control system.

35. A method of training an aircraft pilot to handle in-flight emergencies, the method comprising the steps of:
providing an electronic aircraft flight simulator configured to simulate an aircraft, the simulator including a cockpit and a controller interfacing with the cockpit and including a computer, wherein the controller generates a plurality of simulated aircraft conditions including a plurality of fault conditions, the cockpit having a plurality of aircraft simulator controls and display panels, the aircraft simulator controls including at least an engine throttle and a yoke, the plurality of display panels including a warning light panel with a plurality of indicators each providing a visual signal indicative of an associated fault condition;
providing the pilot with a fault analysis guide, the fault analysis guide including pages printed with a plurality of fault procedures each corresponding to a fault condition, wherein at least one fault procedure is organized in if-then-else format, wherein an 'if' portion of the procedure begins with the word "IF" and indicates a specific simulated aircraft condition that may be generated by the simulator, wherein a 'then' portion of the procedure begins with the word "THEN" and includes a specified operation to be performed by the airplane pilot in the event the specific simulated aircraft condition exists, and wherein an 'else' portion of the procedure begins with the word "ELSE" and includes an alternative operation to be performed by the pilot in the event the specific simulated aircraft condition does not exist;
electronically generating fault conditions in the simulator; and
electronically responding to the pilot's manipulation of the aircraft simulator controls as the pilot performs the procedures identified in the fault analysis guide that are associated with the fault conditions to determine if the pilot properly performed the appropriate fault procedures.

36. The method of claim 35, wherein the 'then' portion of the at least one fault procedure is located underneath and indented with respect to the 'if' portion to indicate subordination to the 'if' portion.

37. The method of claim 35, wherein the words "IF", "THEN" and "ELSE" are printed in a different font than the rest of the fault procedure.

38. The method of claim 35, wherein the words "IF", "THEN" and "ELSE" are printed in a different color than the rest of the at least one fault procedure.

39. The method of claim 35, wherein a fault procedure includes another word acting as a logical operator and selected from the set including OR, AND, GOTO, BEFORE, ALLOW, PRIOR, WHEN, and CASE.

40. The method of claim 35, wherein the at least one fault procedure includes numbered procedure steps.

41. The method of claim 40, wherein the numbered procedure steps include designated informational items, limitations, and action items.

42. The method of claim 35, wherein the at least one fault procedure includes informational indications including warnings, cautions and notes.

43. The method of claim 42, wherein each type of informational indication is printed in a standard font color and stroke.

44. The method of claim 35, wherein a first fault procedure further includes a procedure call that references a second fault procedure and specifies the location of the second fault procedure within the fault analysis guide.

45. The method of claim 35, wherein the at least one fault procedure is terminated with an ending designator and further includes an ending designator at any point where there is no need to continue the procedure.

46. The method of claim 35, wherein a fault procedure corresponding to a fault condition that has an indicator associated with that fault condition includes a printed indicator symbol that is a graphical representation of an associated indicator.

47. The method of claim 35, wherein the fault analysis guide includes a locator section having printed indicator symbols that are arranged in the same general spatial orientation as the arrangement of the plurality of indicators on the warning light panel, wherein each printed indicator symbol is graphically representative of a single indicator and has an associated locator symbol, and wherein the locator symbol indicates the location of the associated fault procedure in the fault analysis guide.

48. The method of claim 47, wherein the associated locator symbol for each printed indicator symbol is printed adjacent to the printed indicator symbol.

49. The method of claim 48, wherein each locator symbol designates a tabbed section of the fault analysis guide and wherein the tabbed section includes a fault procedure to be performed by the airplane pilot when the associated indicator provides a visual signal indicative of its associated fault condition.

50. The method of claim 35, wherein at least one fault procedure includes a procedure step having a reference to an aircraft service change.

51. The method of claim 50, wherein the reference to an aircraft service change is printed in a standard font color.

52. The method of claim 35, wherein at least one fault procedure includes a procedure step having a reference to a circuit breaker and specifying the location of the circuit breaker in the cockpit.

53. The method of claim 52, wherein the reference to a circuit breaker is printed in a standard font color.

54. A method of training an aircraft pilot to handle in-flight emergencies, the method comprising the steps of
providing an electronic aircraft flight simulator configured to simulate an aircraft, the simulator including a cockpit and a controller interfacing with the cockpit, the controller including a computer, wherein the controller generates a plurality of simulated aircraft conditions including a plurality of fault conditions and including fault conditions indicative of physical error conditions for control systems of the simulated aircraft, the cockpit having a plurality of aircraft simulator controls and a plurality of display panels, the aircraft simulator controls including at least an engine throttle and a yoke, the plurality of display panels including a plurality of gauges indicative of simulated aircraft conditions, the display panels also including a messaging system providing a plurality of visual indications each indicative of an associated fault condition;

providing the pilot with a fault analysis guide, the fault analysis guide including a fault procedures section printed with a plurality of fault procedures each corresponding to a fault condition, the fault analysis guide also including a visual procedure locator section and a nonvisual procedure locator section, wherein the visual procedure locator section includes printed visual indication symbols that are each graphically similar to a respective one of the plurality of visual indications on the messaging system, wherein each printed visual indication symbol has an associated locator symbol indicating the location of an appropriate fault procedure in the fault procedures section, and the nonvisual procedure locator section includes a list of the physical error conditions each having an associated locator symbol indicating the location of an appropriate fault procedure in the fault procedures section;

electronically generating simulated aircraft conditions in the simulator;

identifying any fault conditions generated;

selecting either the visual procedure locator section or the nonvisual procedure locator section to locate an appropriate fault procedure for each identified fault condition, wherein the visual procedure locator section is selected if the fault condition is associated with a visual indication on the messaging system and the nonvisual procedure locator section is selected if the fault condition is indicative of a physical error condition;

performing the appropriate fault procedure by manipulation of the aircraft simulator controls; and electronically responding to the pilot's manipulation of the aircraft simulator controls as the pilot performs the appropriate fault procedure to determine if the pilot properly performed the appropriate fault procedure.

55. The method of claim 54, wherein the printed visual indication symbols are arranged in alphabetical order in the visual procedure locator section.

56. The method of claim 54, wherein printed visual indication symbols are printed in the same font color as the color of a respective one of the plurality of visual indications on the messaging system.

57. The method of claim 54, wherein if the locator symbols reference a non-titled procedure, they are printed in a first column and if the locator symbols reference a titled procedure, they are printed in a second column.

58. The method of claim 57, wherein the fault procedures corresponding to non-titled procedures are grouped by sections denoting the seriousness of the fault procedures.

59. The method of claim 57, wherein the fault procedure corresponding to titled procedures are grouped by sections denoting the aircraft control systems.

* * * * *